(12) United States Patent
Miller

(10) Patent No.: US 7,083,720 B2
(45) Date of Patent: Aug. 1, 2006

(54) VARIOUSLY CONFIGURABLE ROTATING BIOLOGICAL CONTACTOR AND PREFABRICATED COMPONENTS THEREFOR

(76) Inventor: Gary Miller, P.O. Box 426, Syracuse, IN (US) 46567

( * ) Notice: Subject to any disclaimer, the term of this patent is extended or adjusted under 35 U.S.C. 154(b) by 0 days.

(21) Appl. No.: 10/848,917

(22) Filed: May 19, 2004

(65) Prior Publication Data

US 2005/0258083 A1 Nov. 24, 2005

(51) Int. Cl.
*C02F 3/08* (2006.01)
(52) U.S. Cl. .................. 210/150; 210/156; 210/232; 210/619
(58) Field of Classification Search ............... 210/150, 210/151, 156, 157, 232, 619
See application file for complete search history.

(56) References Cited

U.S. PATENT DOCUMENTS

| | | | |
|---|---|---|---|
| 4,160,736 A * | 7/1979 | Prosser .................. | 210/150 |
| 4,345,997 A * | 8/1982 | McConnell et al. ........ | 210/150 |
| 4,608,162 A * | 8/1986 | Hankes et al. ............. | 210/232 |
| 4,692,250 A | 9/1987 | Miller | |
| 4,729,828 A | 3/1988 | Miller | |
| 4,737,278 A | 4/1988 | Miller | |
| 4,999,302 A * | 3/1991 | Kahler et al. ............... | 210/619 |
| 5,227,055 A | 7/1993 | Timmons | |
| 5,326,459 A | 7/1994 | Hlavach et al. | |
| 5,395,529 A * | 3/1995 | Butler ..................... | 210/151 |
| 5,425,874 A * | 6/1995 | Gass ......................... | 210/150 |
| 5,637,219 A * | 6/1997 | Robinson et al. ........... | 210/150 |
| 5,853,591 A * | 12/1998 | Snyder et al. .............. | 210/619 |
| 5,868,926 A * | 2/1999 | Hickok et al. .............. | 210/150 |
| 6,783,669 B1 * | 8/2004 | Okagawa et al. ........... | 210/150 |

FOREIGN PATENT DOCUMENTS

EP  249433  * 12/1987

OTHER PUBLICATIONS

Perry's Chemical Engineers'Handbook, 7th Ed. 1997 pp. 25-64 to 25-76.
Steven D. Van Gorder et al. "Home Aquaculture" 1983, pp. 21, 33, 37, 43-51, 79, Ap. C pp. 79,81,83,85,87,89,91,93,95,97,99,111.
R. Klees & Silverstein, Wat. Sci. Tech. 26, 545-553, 1992.
Perschbacher & Freeman, "RAS Polyculture of Channel Catfish, Nile Talapia" Global Agua. Adv. Apr. 2004, p. 66.

* cited by examiner

*Primary Examiner*—Christopher Upton
(74) *Attorney, Agent, or Firm*—Olson & Hierl, Ltd.

(57) ABSTRACT

Improved fabricated subcomponents, components and rotating biological contactor embodiments that are assembled from, and that incorporate, such subcomponents and components are achieved. The components comprise tank sections, bulkheads, contactor drums, paddle wheels, shaft assemblies including associated bearings and supports, each of which may be assembled from preformed subcomponents if desired. Rotating biological contactors are assemblable at an installation site, which may be a confined space if desired, by two men with simple tools. In an assembled rotating biological contactor, the shaft assemblies can rotated by an electric motor, by fluidic pressure exerted upon paddle wheel blades, or by both in combination.

42 Claims, 19 Drawing Sheets

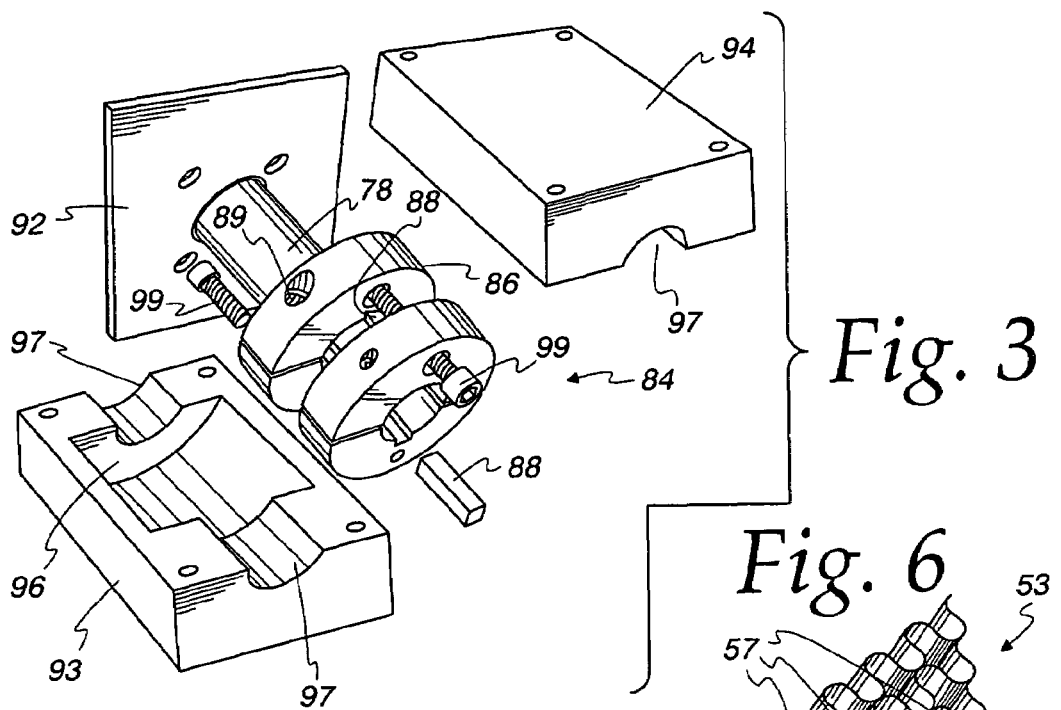
Fig. 3
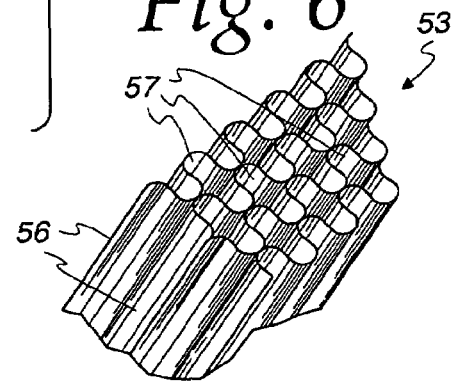
Fig. 6
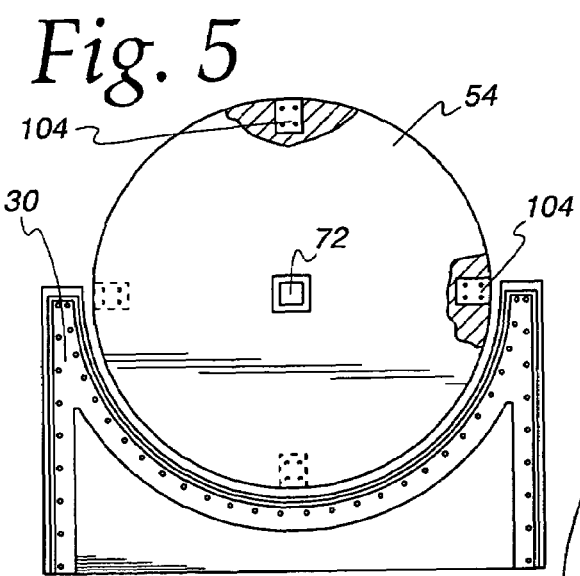
Fig. 5
Fig. 8

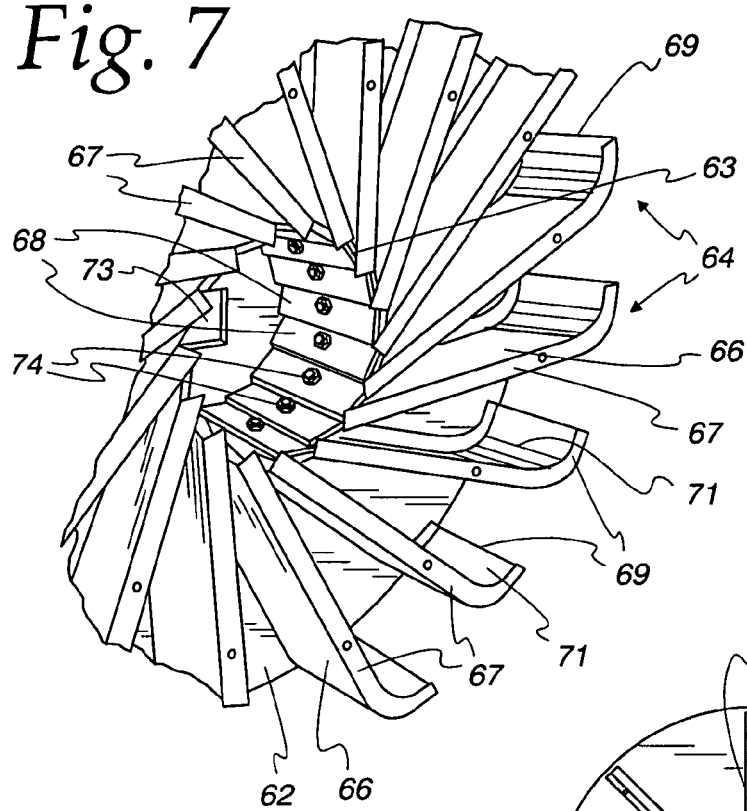
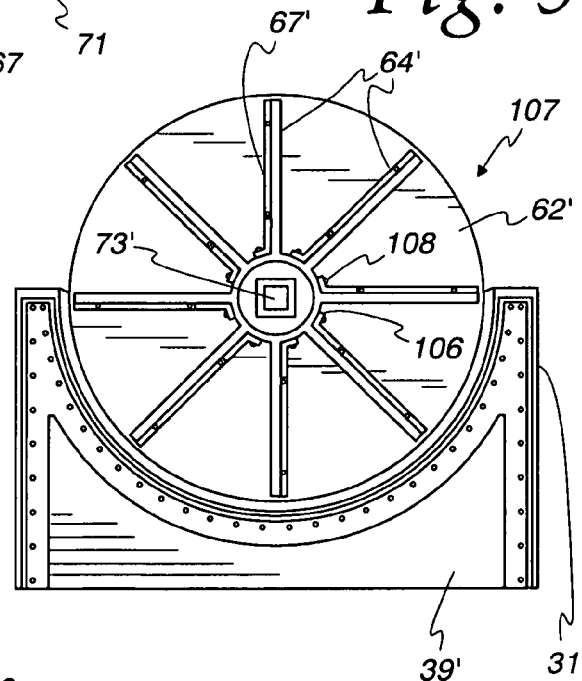
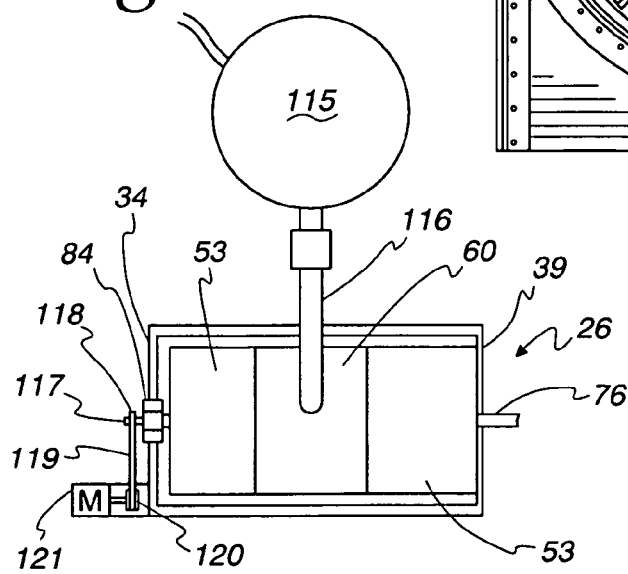

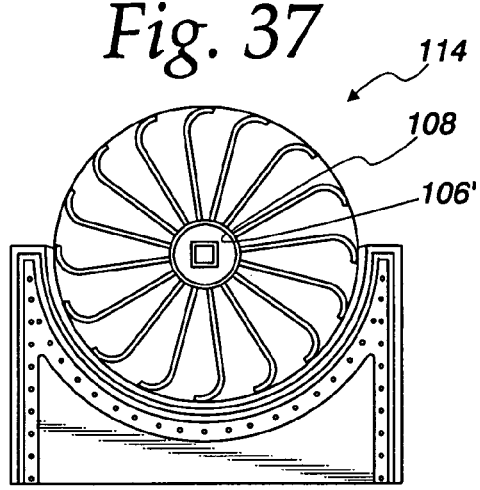
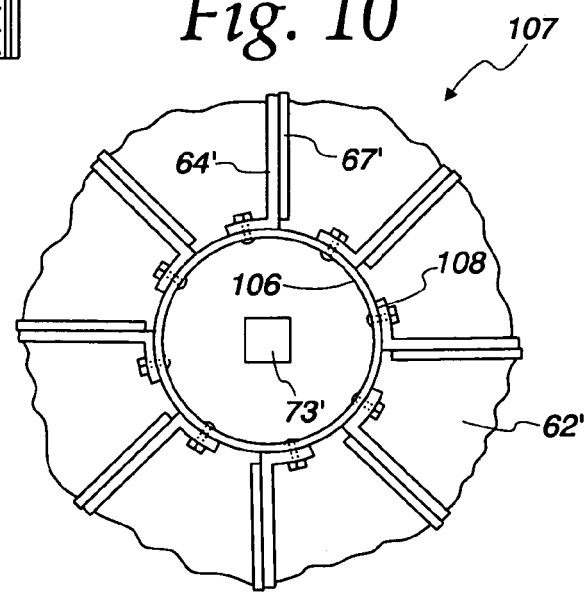
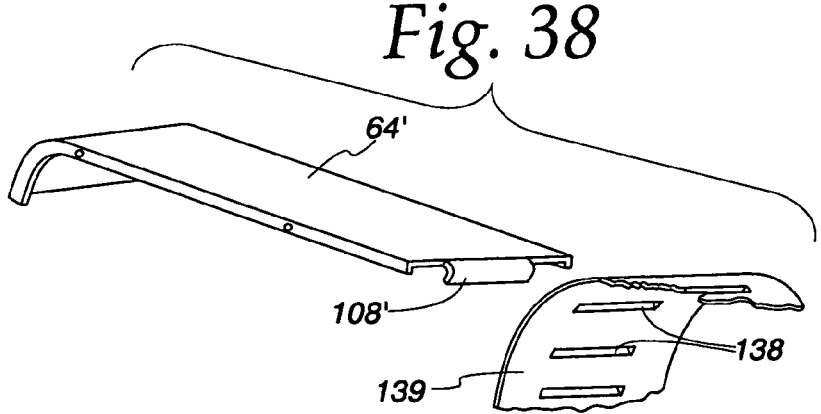

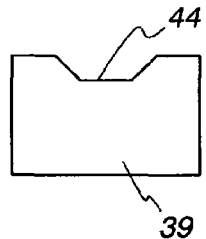
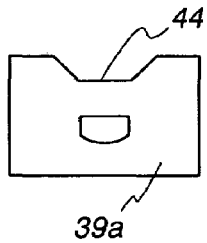
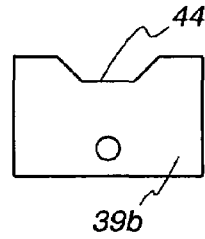
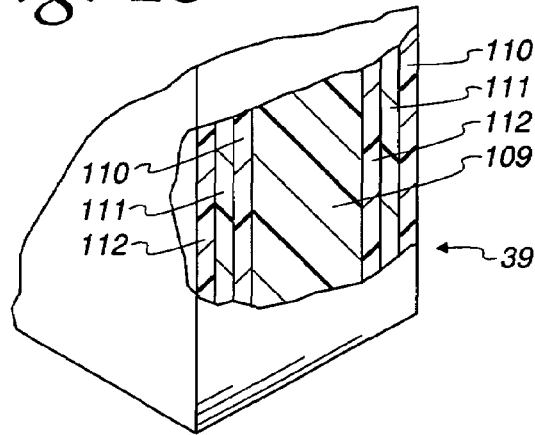
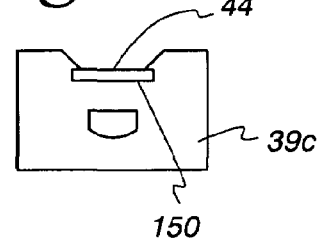
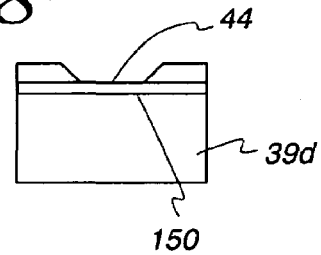
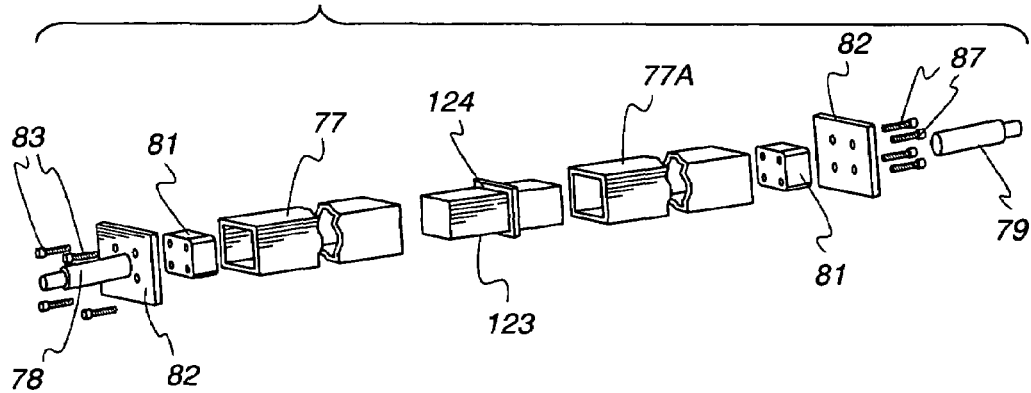

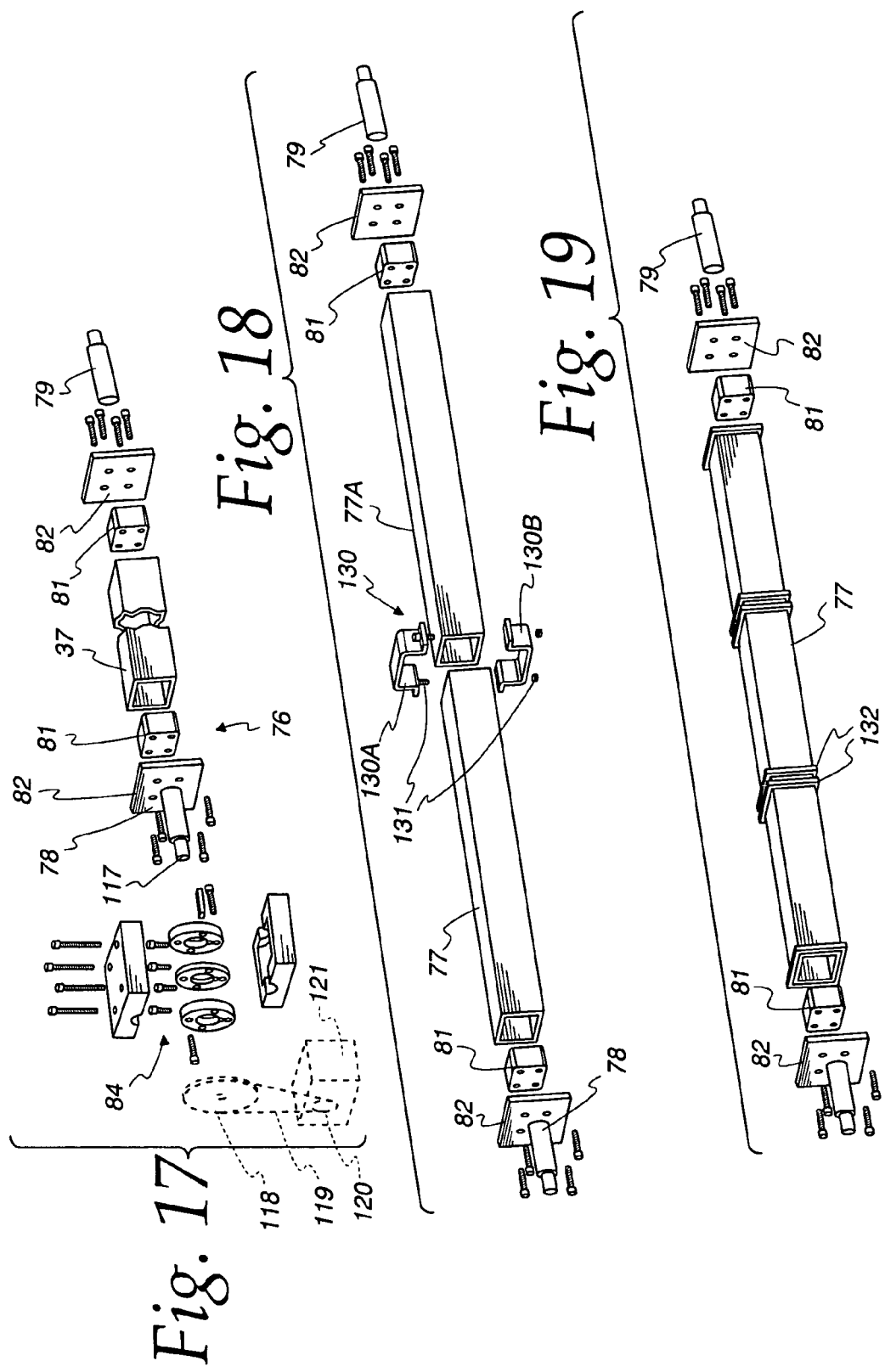

VARIOUSLY CONFIGURABLE ROTATING BIOLOGICAL CONTACTOR AND PREFABRICATED COMPONENTS THEREFOR

FIELD OF THE INVENTION

This invention lies in the field of rotating biological contactors which are comprised of prefabricated subassemblies that can be variously assembled to achieve various configurations and various operating functions.

BACKGROUND OF THE INVENTION

Rotating biological contactors (RBC's) are used for the biological treatment of wastewater. Such a device or system characteristically utilizes at least one wastewater contacting medium which is fixed upon a rotatable shaft that is arranged to continuously revolve in a reservoir of wastewater to be treated. As the contacting medium revolves, a biological culture naturally develops on it and this culture has the capacity for digestion of contaminating substances in the wastewater. As the contacting medium bearing the culture rotates, it experiences alternatively exposure to wastewater and then to oxygen (air), thereby achieving aerobic treatment of the water contaminants. Alternatively, the medium can be completely submerged within the wastewater for anoxic and/or anaerobic processes to treat the waste stream.

Currently, what is believed to be the most common commercially available form for an RBC utilizes a single, horizontally rotating shaft about eight meters (about 25 feet) long which carries contacting media or contactors having a gross diameter of about four meters (about 12 feet) which provide a total of about 10,000 square meters (about 100,000 square feet) of media surface area. Commonly, such one shaft extends across a single reservoir or stage. Multiple reservoirs (or multiple stages) can be used which are preferably arranged so as to be successively coaxial or longitudinally adjacent to achieve a maximized wastewater treatment. In RBCs having a longitudinal axis, the tank or trough (usually hemi-cylindrically sided) may be subdivided into a plurality of axially aligned, longitudinally adjacent stages by means of transversely extending baffles or bulkheads. Such a multistaged-type of RBC is commercially available in various sizes from various manufacturers. In a commercially available RBC, circular contactors may be employed which have contactor diameters ranging from about 0.7 meters (about 2 feet) to about 4 meters (about 12 feet), and the number of individual stages ranges upwards from one.

It is most often desirable to design an RBC with multiple stages, generally three or more. Experience teaches that by providing the requisite amount of media (contactor) surface area for bacterial colonization into multiple, sequential stages, performance is enhanced. This sequencing of stages promotes a tendency for bacterial specialization to occur along the sequence as specific contaminants are destroyed by those bacterial species which have the fastest rate of consumption. This is comparable, for example, to making an activated sludge reactor very long or a packing tower (trickling filter) very tall. If the same media surface area were divided among stages in parallel, even though the total flow rate through and the total volume of the sum of all stages (and hence the waste water contact time per unit area of media surface area) remain then same, the advantage of sequential processing (and bacterial specialization) would be missed.

Commonly, the trough or tankage portion of a conventional large commercially available RBC is typically locally designed and built to accommodate rotating circular contactor(s) that are supported on an associated shaft and shaft drive assembly purchased from the manufacturer. Such a tankage portion is commonly fabricated on-site of poured concrete. Smaller, test RBC units are available that employ steel tankage. Also, still smaller units suitable for residual wastewater treatment, and for the aquaculture and aquarium industries, are available which have tankage portions comprised of fiberglass or other plastic. However, in all known commercial forms of RBC's, the tankage portions are individually designed and fabricated either to order or as packaged assemblies, and all such RBC embodiments are either fixed, or are characterized by having very limited variability in operational configuration. Their stationary components, such as the tankage portion, are dimensionally fixed.

For an RBC installation to treat wastewater, it is desirable initially to evaluate and characterize the particular wastewater and to design and adapt a RBC system for usage with that particular wastewater so that system parameters are optimized for best or maximized effective treatment of that wastewater. Various RBC design procedures and criteria are known to those skilled in the art. If desired, for design purposes, a miniaturized RBC embodiment may be preliminarily used to evaluate samples of the wastewater and identify operating parameters. For example, one suitable miniaturized RBC system is disclosed in my U.S. Pat. No. 4,737,278.

It has become routine for a wastewater to be characterized and for mathematical models to be used to design RBC installations for treating that wastewater; see, for example, "Design of Biological Treatment Systems," pages 25–66–25–76 in Perry's Chemical Engineers' Handbook, Seventh Edition (1997) McGraw Hill. However, there are wide variations in wastewater characteristics.

Because of the many variations in application situations, a need exists for RBC apparatus which can be rapidly, simply, reliably and economically fabricated and assembled, and then later, if need be, modified and/or expanded even after an initial installation has been completed and operated. A plurality of various potential RBC apparatus configurations would be desirable using the same components. The capability for using the same components to construct a variety of RBC assemblies would, if available, offer many practical advantages, especially where the characteristics of a particular wastewater are incorrectly initially determined, or substantially change over time. To this end, the technology of my U.S. Pat. No. 4,729,828 was provided to introduce modularity into RBC design considerations.

Though the technology of my '828 patent is very useful, it would be desirable to improve such. For one thing, it would be desirable to improve system versatility so that an assembled RBC comprised of preformed components can have a greater variety of different configurations. In the '828 system, for example, the tank or trough volume of each successive stage is determined by the interior length of a preformed tank-defining section which has fastened at and across each longitudinal opposite end thereof a bulkhead-type member. For greater versatility, the interior length of the trough of a single stage needs to be variable incrementally. Selected tank housing sections need to be joinable adjacently without the need for a bulkhead-type member positioned between each pair of longitudinally adjacent tank housing sections. Outside support side walls of trough defining sections need to be separate from, but associatable with, the trough defining sections themselves in certain circumstances.

For another thing, the respective longitudinally extending individual shaft structures when located in each stage should be more readily length adjustable and should be more readily, simply and reliably connectable with, and disconnectable from end adjacent, coaxial end shafts of shaft structures located in longitudinally adjacent stages so that all shafts, as coaxially interconnected, rotate together yet be readily connectable and disconnectable.

For another thing, it would be desirable for the assembled RBC to be operationally more energy efficient so that less applied power, particularly electric power, would be needed in system operation for shaft rotation. In, for example, some RBC installations of the type taught by my '828 patent, relatively large (and thus relatively expensive) amounts of electric power may need to be expended in rotating the shaft.

For another thing, it would be desirable for an RBC to be fittable into an existing relatively confined structure (such as a building, pit, etc.) and to be readily assembled from prefabricated components, even by only two men using simple tools.

The developing field of aquaculture brings new and additional challenges to wastewater treatment and to RBC structures useful in treating wastewaters from such field. A desire for recirculated water and water reuse for use in aquaculture production has developed which necessitates solving the problems of achieving consistent water quality while conserving the use of water and the energy required to maintain stable water temperatures for continuous production at latitudes where substantial environmental temperature variation is normal. Also, aquaculture facilities that employ more traditional fish production techniques employing only new water and require large wastewater flows may no longer be appropriate. This is especially true if the aquaculture facility is located near desired markets where competing uses of land and water limit access to resources and require constraining demands on wastewater.

Each species of fish cultured requires an optimized water temperature for rapid growth. This temperature typically falls in the range from about 5° C. to about 40° C. Likewise, salinity influences fish culture and typically falls in the range from 0 to about 40 ppt. Also, unique dietary requirements for these cultured species can include protein contents typically ranging from less than about 30% to greater than about 50%. Dietary protein ultimately leads to ammonia contamination of the culture water. Typically, those fish species which require a lower temperature environment also require the highest dietary protein. When using a biological filter, such as an RBC, both these conditions require a relatively large contactor media surface area to assure sufficient biological activity for purposes of achieving and maintaining a set of desired or necessary water quality conditions, particularly when water recirculation is contemplated. As temperatures fall, bacterial activities slow, thus requiring increased medium surface area to obtain sufficient bacterial colonization to obtain desired levels of nutrient destruction. Likewise, as the protein level in the feed increases, ammonia production increases, requiring increased medium surface area to obtain the requisite ammonia destruction.

With relatively stringent water quality parameters, such as total ammonia nitrogen (TAN) as low as 1.0 mg/l and nitrite nitrogen ($NO_2$–N) as low as 0.1 mg/l on the outlet from the wastewater treatment unit, RBC design specifications which will result in such output water parameters are little understood. RBC equipment and operating conditions have heretofore commonly not been commercially available to readily satisfy such stringent and/or variable circumstances. To permit or enhance the use of RBCs in such demanding conditions and circumstances, it would be desirable to have convenient and readily assembled or disassembled improved components for use in RBC systems.

Particularly in aquaculture, the need is great for relatively low cost, economically operating RBC's that are comprised of relatively low cost, easily transported, handled and assembled components and that can achieve output water which meets stringent water quality parameters and so is recirculatable. A large user component of the aquaculture field is comprised of small entrepreneurial and family farm establishments that utilize existing structures as aquaculture facilities, such as garages, barns, idle livestock production buildings, warehouses, and the like. An embodiment of RBC apparatus manufactured by the prior art techniques and components, such as above indicated, proves extremely difficult to fabricate and use from the standpoints of cost, transportation, and user assembly in such small facilities. The problem is exacerbated by the fact that many of these facilities have a ceiling height of less than about three meters (about 10 feet). RBC components need to be small enough for convenient transport and for assembly in such a structure by no more than two individuals.

It appears that, particularly in the aquaculture field, readily assemblable RBC components and subcomponents that are low cost, adaptable for use in small space, and easily manipulated are needed and would potentially enjoy wide usage.

SUMMARY OF THE INVENTION

More particularly, in one aspect, the present invention relates to improved, variously configurable, rotating biological contactors (RBCs) which can, if desired, be comprised of multiple stages, and which incorporate prefabricated modular-type components.

In another aspect, the present invention relates to prefabricated modular-type components which can be easily and simply utilized to fabricate various RBC structures.

In another aspect, the present invention relates to prefabricated subcomponents which can be assembled readily, simply and reliably into modular-type components that are useful in RBC structures.

As those skilled in the art will readily appreciate, the various prefabricated components and subcomponents here achieved need not all be incorporated into a single RBC embodiment. However, these components and subcomponents permit one to design and assemble various RBC embodiments. Particularly after an RBC has been designed to work with a particular wastewater, these components and the subcomponents are particularly well adapted for movement into and location in a confined space or RBC installation site if desired and for ready fabrication and assembly into an RBC by as few as two relatively unskilled individuals using simple tools. The advantage of these components and subcomponents is that a few standardized units provide the opportunity to not only design an individualized kit for on site assembly of an RBC that has been specifically designed to meet the needs of most any wastewater application, but also by simply adding, subtracting, or rearranging components and subcomponents, treatment performance can be enhanced. Moreover, the RBC structures made with or incorporating such components and subcomponents are sturdy, reliable, economical and easy to use and maintain.

The subcomponents, components, and RBC structures provided here are versatile, easily handled and utilized, and are believed to make possible the easy and convenient fabrication, achievement, and utilization of RBCs particularly in locations and in circumstances not previously convenient, or practical, for RBCs.

The novel and very useful RBC components here provided include, for example:

(A) Trough (or tank) defining sections that usually include side wall defining portions for a trough. Preferably, a plurality of such sections may be considered, if desired, to comprise, a trough section set. Trough sections of a set can have similar widths and depths, and are preferably hemicylindrically configured so that, if desired, these trough sections can be employed in a single RBC, and can be arranged together in an adjacent, end-to-end relationship, longitudinally along a common longitudinal axis, so that, if desired, a longitudinally extending trough can be defined between adjacent pairs of the trough defining sections. Preferably, each opposite end of each trough section extends transversely and perpendicularly. Side wall defining portions can be oriented perpendicularly (preferred) or inclined (relative to vertical) and characteristically have access apertures defined therein. Preferably, the trough sections of a set have similar respective longitudinal lengths, although trough sections in a set may have, if desired, various longitudinal lengths. Longitudinally adjacent trough sections are easily aligned and fastened together.

(B) Bulkheads for transversely extending across respective opposite end portions of a trough defining section.

A first type of bulkhead is adapted for locating at, across and adjacent to one end of a trough defining section, thereby to define an trough endwall. Preferably the bulkhead type has upper wall edge portions that are about the height of the adjacent trough defining section. Preferably the bulkhead type supports an adjacent trough end section in a stable or upwardly spaced relationship relative to an underlying generally horizontal support surface (such as a floor, ground, or other surface). Each bulkhead type may have aperture means defined therein for achieving fluid flow therethrough. Preferably, a longitudinally spaced but adjacent pair of the first type of bulkhead serve to define a stage located along the trough defined by at least one trough defining section in an RBC.

A second type of bulkhead is adapted for locating at, across and adjacently between a pair of longitudinally adjacent trough defining sections while permitting the respective interior surface configurations of the adjacent respective trough sections to be longitudinally generally aligned and substantially longitudinally continuous, thereby to lengthen the trough length to be about the combined length of each of the trough sections. Preferably, the bulkhead supports the adjacent trough section ends in upwardly spaced relationship relative to an underlying generally horizontal support surface.

(C) Shaft assemblies adapted to extend longitudinally along the longitudinal axis of a least one trough defining section or a plurality of longitudinally adjacent, axially aligned trough defining sections. Each shaft assembly includes (a) a cross-sectionally rectangular mid-region, (b) a cross-sectionally circular end region at each opposite end of the mid-region, and (c) first connecting means for coaxially joining each end of the mid-region with one end of a different end region. Each shaft assembly may optionally include (d) second connecting means for coaxially joining a pair of adjacent cross-sectionally rectangular mid region sections. Typically, there is one shaft assembly per RBC stage but a single shaft assembly can extend longitudinally through a plurality of longitudinally adjacent trough defining sections; a shaft assembly preferably has a length that is at least equal to the length of an associated stage.

Preferably in an RBC embodiment a shaft structure such as herein provided extends longitudinally, perpendicularly and axially through the trough defining portions, contactor members and paddle wheel assemblies.

Each shaft assembly is associated with bearing means for rotatably mounting and suspending each end region of a shaft assembly. Various bearing means can be utilized. Each shaft assembly and bearing means still further includes support means for supporting each bearing means relative to one first type of bulkhead whereby, if desired, a shaft assembly can extend longitudinally and axially through a single trough defining section and be rotatably supported at each of its respective opposite ends by a different first type of bulkhead.

A pair of bearing assemblies is preferably provided that can be considered to comprise a bearing block assembly. A bearing block assembly can be provided at each end of a shaft assembly for association with each one of a pair of different, adjacent, coaxial shaft end regions, each end region being associated with a different one of a pair of longitudinally adjacent shaft assemblies. These bearing assemblies are in longitudinally aligned, coaxial relationship relative to each other in a bearing block assembly.

Support means is provided for bearings. A support assembly is preferably provided for each of the bearing block assemblies and the support assembly is preferably supported by an upper portion of a first type of bulkhead. Preferably a structure means that is supported on or by a first type of bulkhead. Preferably, the support means includes a platform means upon which a bearing or bearing block assembly may rest.

Also, in a bearing block assembly, the respective bearing means of this pair of bearing assemblies are interconnected relative to one an other so that when one shaft end region is associated with one bearing assembly, and the second shaft end region is associated with the other bearing assembly, these respective shaft end regions rotate together so that as one shaft end region rotates, the adjacent one shaft region also rotates. Thus, a plurality of shaft assemblies if present in a given RBC are interconnected together in end-to-end, co-axially aligned relationship, so that the shaft assemblies rotate together.

Preferably, in an RBC, the component shaft assembly (or shaft assemblies, as the case may be) is/are functionally connected with, and rotatable by, a motor driven drive assembly which can be conventional. More preferably, this drive assembly includes a geared electric motor means.

(D) Contactor drum. Here a contacting medium is preferably drum configured. A contact drum is generally cross-sectionally circular relative to its axis and that has center portions that are each to extend over and about portions of the mid-region of a shaft assembly. Each contactor drum is an assembly that is at least in part prefabricated. A fully assembled contactor drum is adapted for rotation with a shaft assembly while located in the trough of a trough-defining section with the contactor drum assembly being in spaced, adjacent relationship to transversely adjacent portions of the trough defining section. If desired, a plurality of individual contactor drum assemblies can be employed in an RBC embodiment with preferably each contactor drum assembly being in longitudinally spaced relationship relative to others thereof.

(E) Paddle wheel. Here a paddle wheel is preferably drum configured and is generally or grossly cross-sectionally circular relative to its axis and has center portions that are each adapted to extend over and about portions of the mid-region of a shaft assembly. Each paddle wheel is an assembly that is at least in part prefabricated. A fully assembled paddle wheel is adapted for rotation with a shaft assembly while located in the trough of a trough-defining section with the paddle wheel assembly being in spaced, adjacent relationship relative to transversely adjacent portions of an RBC embodiment with preferably each paddle wheel assembly being in longitudinally spaced relationship relative to others thereof.

Preferably, the trough defined by a trough defining section and a first type of bulkhead at each end thereof is chargeable with a wastewater to an extent, if desired, such that up to about 50% of each of the contactor drum assemblies and the paddle wheel assemblies may be immersed in said wastewater. Preferably, each paddle wheel is adapted to be rotatably driven by a fluid stream (either a gas, including air, or a liquid, including wastewater, or a mixture thereof). Thus, a shaft assembly is rotatable by either one or both of a connected powerhead and the fluid stream.

The trough defining sections, the bulkheads, the shaft assemblies, the contactor drum assemblies, and the paddle wheel assemblies are each preferably comprised of prefabricated subcomponents such as are taught herein and that are useful in the assembly and operation of RBC embodiments, and these prefabricated subcomponents and the components assembled therefrom are believed to be inventive and to form portions of the present invention.

The novel and very useful RBC subcomponents here provided include, for example:

(A) Subcomponents that in combination define a trough (or tank) defining section as above identified. The subcomponents can include, for example, (a) a generally hemicylindrically configured central portion that defines a longitudinally extending trough, (b) side leg portions that may be associated at an end region of a side leg portion with a lateral side region of a central portion either integrally or detachably thereby to support the central portion in a generally horizontal orientation. A plurality of such subcomponent portions may be considered, if desired, to comprise, a set for achieving one or more trough defining sections. Trough sections defined by subcomponent portions of a set can have similar widths, depths and heights, and are preferably individually configured so that, if desired, the trough sections defined by a combination of the subcomponent portions can be employed in a single RBC.

Preferably such trough sections can be arranged together in an adjacent, end-to-end relationship, longitudinally along a common longitudinal axis, thus defining, if desired, a longitudinally extending trough between adjacent pairs of such trough defining sections. Preferably, each opposite end of each trough section defined by a combination of central and side wall defining subcomponent portions extends transversely and perpendicularly relative to the so defined trough section. Preferably, the trough sections defined by a set have similar respective longitudinal lengths, although trough sections in a set may have, if desired, various longitudinal lengths.

(B) Subcomponents that in combination define a bulkhead structure as above identified. The bulkhead structure can comprise a first type or a second type of bulkhead as above identified for transversely extending across respective opposite end portions of a trough defining section.

One present preference is to provide bulkhead subcomponents that can be interfacially associated together to comprise a layered or laminated bulkhead structure.

(C) Subcomponents that in combination define a shaft assembly as above identified.

A shaft assembly can be comprised of various components. For example, the mid region and the opposite end regions of a shaft assembly can be provided in various lengths and transverse widths, and various first and second connecting means can be provided.

Various bearing assemblies can be utilized with a shaft assembly.

(D) Subcomponents that in combination define a contactor drum assembly as above identified. A presently preferred arrangement is to provide subcomponents that include half portions of a contactor drum assembly that matingly engage to comprise the contactor drum assembly with the assembly located at its center about the mid region of a shaft assembly.

(E) Subcomponents that in combination define a paddle wheel assembly as above identified. A presently preferred arrangement is to provide subcomponents that comprise paddle wheel portions that matingly engage to comprise a paddle wheel assembly with the assembly located at its center about the mid-region of a shaft assembly.

The trough defining sections, the bulkheads, the shaft assemblies, the contactor drum assemblies, and the paddle wheel assemblies can be, and preferably are, if desired for small environments and assembly by not more than two men, each be comprised of prefabricated subcomponents such as are taught herein and that are useful in the assembly and operation of RBC embodiments. These prefabricated subcomponents and the components assembled therefrom are believed to be inventive and to form portions of the present invention.

Hence, in one aspect, as above indicated, the present invention relates to a group of novel and very useful individual pre-fabricated components and subcomponents that are adapted to be assembled variously and to co-act together in components or in RBCs, thereby to produce a desired embodiment of an improved RBC structure of the present invention.

The subcomponents and the components can be variously connected together to produce novel and very useful RBCs. The components, and the combinations of subcomponents, can, if desired, be combined with other components and subassemblies to achieve fabrication of an RBC embodiment which is novel and very useful. The subcomponents and the components comprised thereof are versatile, durable, simply assembled, and variously usable particularly in fabricating an RBC structure. A resulting RBC structure is itself novel and very useful.

Preferably, the individual subcomponents are preferably substantially unitary in structure, and are readily and simply interconnectable with one another as structural building units to comprise components and RBCs.

As those skilled in the art will readily appreciate, the components and the subcomponents are preferably connected together by various conventional means during assembly and fabrication of an RBC, such as hereinbelow illustrated or otherwise as desired. Examples of connector means include screws, nut and bolt assemblies, brackets, braces, and the like. Preferably the connector means are comprised of plastic or metal, most preferably stainless steel.

As those skilled in the art will readily appreciate, preferably and characteristically, prefabricated subcomponents and components are individually portable. Such are conveniently comprised of metal and/or plastic materials, preferably materials that after fabrication are inert, durable, insoluble, non-toxic, and non-corrosive. In the case where food production is involved, the construction materials should be of food contact grade. If desired, a subcomponent or component, such as in a trough-forming section, can incorporate or contain embedded, or associated, metal subcomponents for rigidification or structural enhancing purposes. Various plastic and metal materials can be used in fabricating components, as those skilled in the art will readily appreciate. A presently preferred plastic comprises a thermosettable plastic such as a fiberglass reinforced polyester, like a polyethylene terephthalate, or a thermoformable plastic such as a polyvinylchloride. A presently preferred metal comprises a stainless steel.

In an RBC embodiment of the invention, the various components and subcomponents are variously configurable and constructable, as those skilled in the art will appreciate. Preferably, each of the prefabricated subcomponents is substantially unitary in structure, thereby to facilitate durability and enhance ease of assembly or disassembly with other components and subcomponents of an RBC embodiment. The components and subcomponents are preferably readily and simply interconnectable, preferably disconnectably, with one another as structural subunits so as to be conveniently useful and functional in creating and operating an RBC embodiment for use in treating a particular wastewater (preferably based on initially determined RBC design criteria for that wastewater).

An embodiment of an RBC structure is preferably assembled from a selected combination of preliminarily fabricated components and subcomponents, such as are provided by the present invention, so as to meet a preferably preliminarily identified and designed set of functional operating parameters. Thus, preferably through an initial selection of a particular set of functional operating parameters, and of particular such pre-fabricated components and subcomponents, a desired or chosen particular structural assembly for an RBC system is achieved.

In an assembled and functional RBC embodiment, as above indicated, the region between an adjacent pair of bulkheads is preferably adapted to define a stage, and, if desired, an RBC embodiment can be comprised of a plurality of stages that are arranged in longitudinally adjacent relationship relative to one another along the tank. More than one trough defining section can be located between a pair of longitudinally adjacent bulkheads.

In operation, as those skilled in the art appreciate, wastewater being treated in an RBC embodiment is illustratively and typically or conveniently charged to the RBC embodiment adjacent to an end region thereof, and advances (flows) longitudinally through the RBC progressively from one stage to another (if the RBC utilizes more than one stage), and exits adjacent to an opposite end region thereof. During operation, the contactor members, and, if present, the paddle wheel members, are rotated on their common shaft means. An RBC embodiment is associated with conventional means for conveying untreated wastewater to and treated wastewater therefrom.

By selecting component dimensions, such as the diameter and the longitudinal length (relative to the trough defined by the trough defining sections or relative to stages defined by the sections and bulkheads), the contactor drum assembly and the paddle wheel assembly are enabled to participate in various configurations of an RBC embodiment. The contactor drum and paddle wheel embodiments are preferably circular.

In a presently preferred RBC embodiment, a paddle wheel subassembly has vanes that are responsive to fluidic pressure locally applied thereagainst so that resultingly the involved paddle wheel is rotatably driven thereby. The fluidic pressure can be gas (preferably air), water (preferably wastewater) or a mixture of both. The fluidic pressure, when utilized, can comprise either the sole power source for rotating the shaft structure of the RBC, or a portion of the power source. If the latter, then the fluidic pressure can be utilized in combination with another power source.

Various power sources and power transfer arrangements can be utilized. Typically, when a power source such as an electric geared motor is employed, it is functionally associated with the shaft means by means of a conventional power transfer means.

In some RBC embodiments, and in some operating conditions and locations, it has been found that the need for a geared electric motor to power rotation of assembled shaft sections and shaft associated components can be partially or even completely eliminated by equipping the RBC with at least one paddle wheel mounted preferably coaxially adjacent to a contactor on a shaft section. The force of water and/or air against the blades of the paddle wheel(s) provides power for rotating the shaft structure and shaft associated components. For example, in an application where wastewater is input into and flows through an RBC embodiment at a relatively rapid rate, a portion of the wastewater in the receiving stage can be deflected against paddle wheel blades in that stage, thereby reducing the amount of electric power required for shaft turning.

Another bulkhead member of the first type, particularly if located intermediately between a pair of longitudinally adjacent tank forming sections, preferably has at least one porthole defined therethrough. Each porthole may optionally be provided with a porthole closure. Each porthole closure may optionally be adjustable or removable so that the effective size of an associated porthole is adjustable.

Contactor members and paddle wheels for RBCs appear to have been known to the prior art. However, so far as now known, nothing in the prior art discloses or suggests the structures achieved presently.

One new and very useful class of contactor drum assemblies is provided by the present invention. Such a contactor drum assembly has, when assembled, a drum-like configuration, and which when disassembled comprises approximately two halves that cooperatively engage along a drum diameter and fit over and about a shaft means that extends perpendicularly and axially therethrough.

One new and very useful class of paddle wheel assemblies is provided by the present invention. Such a paddle wheel assembly has a general cylindrical configuration with access to paddle wheel blades being along circumferential portions. This paddle wheel assembly is comprised of two portions which when assembled are brought together about a shaft means that extends perpendicularly and axially therethrough.

A new and useful class of trough-defining sections is provided wherein the sidewalls are opposed to each other integral generally perpendicularly downwardly from the top side portion of each section's medial portions, and each side wall has a central aperture defined therein which permits access therethrough for purposes of assembly of adjacent components, such as other trough-defining sections, bulkheads, or the like with screws, nut and bolt assemblies or the like.

Another new and useful class of trough-defining sections is provided wherein at least one and optionally both of the sidewalls are detachable from each of the trough-defining sections thereby to provide trough-defining section versatility for purposes of RBC assembly, maintenance, or the like, as taught herein.

If desired, an embodiment of an RBC of the present invention can be preceded by upstream wastewater processing equipment or succeeded by downstream wastewater processing equipment.

The individual components utilized in the present invention are economical to fabricate, reliable, durable, sturdy, and easy and simple to associate together.

The embodiments of RBC's produced in accord with the teachings of the present invention are economical, easy to assemble, reliable, durable and sturdy.

One object of this invention is to provide RBC embodiments comprised of preformed components and subcomponents that have a maximum amount of utility and utilization.

Another object is to achieve preformed components that are transportable, that are able to be assembled into RBC embodiments by only one or two men, if desired.

Another object is to achieve components that enable the assembly and use of an RBC embodiment in a confined location, such as a room having a relatively low ceiling, or an open cavity of limited depth, such as an old machine access pit, or the like.

Another object is to provide modular RBC systems which are easy to use, assemble and maintain, and which are reliable, economical and well adapted for usage in substantially all situations where modular RBC systems can be employed for wastewater treatment.

Another object is to provide improved modular RBC apparatus and components that are well suited if desired for use in pilot studies and the like of the type where RBC apparatus can be varied in structural configuration, thereby to increase the capability and capacity to evaluate and to fine-tune a given installation design, or the like, as those skilled in the art may desire to achieve.

Another object is to provide in RBC apparatus the capacity for providing a modifiable system which can be structurally altered or adjusted, including expanded or contracted, so that, as, for example, a given community wastewater treatment problem changes with community growth or decline, industrial growth or decline, or the like, an initial RBC apparatus can be expanded, contracted, and/or modified without having to replace the entire original RBC apparatus, thereby achieving economies.

Another objective is to provide the capacity for a community to build plant that incorporates an RBC for treatment of wastewater with an RBC design such that the immediate needs of the community are met at a particular acceptable cost while yet preserving the capacity of that community to meet different needs at a later date without having to build entire new plant, thereby reducing initial installation costs, operating costs, and even subsequent operation costs.

Another object is to provide a RBC apparatus that is adapted for use within the recirculating water aquaculture community, that is suitable for satisfying the needs dictated by the requirements for maintaining desirable water quality parameters, and that can be employed for the economical production of a wide variety of commercially important aquaculturable species.

Other and further objects, aims, features, purposes, advantages, embodiments, and the like will be apparent to those skilled in the art from the teachings of the present specification taken with the accompanying drawings and the appended claims.

BRIEF DESCRIPTION OF THE DRAWINGS

In the drawings:

FIG. 3 is a partial exploded perspective view of the shaft bearing block assembly of the rotating biological contactor embodiment shown in FIG. 1 in association with the end region of the shaft;

FIG. 5 is a transverse sectional view through the FIG. 1 rotating biological contactor embodiment showing an end elevational view of the first stage contactor drum with portions of its side wall being broken away;

FIG. 6 is an enlarged, fragmentary, perspective, detail view of the interior region of one arrangement for corrugated layers in a FIG. 5 contactor drum;

FIG. 7 is an enlarged, fragmentary, perspective, detail view of portions of the paddle wheel structure shown in FIG. 1 with one end wall thereof being removed;

FIG. 8 is a perspective view of an alternative the paddle wheel structure with portions of one end wall thereof being broken away;

FIG. 9 is a transverse sectional view taken through the FIG. 1 embodiment showing a side elevational view of an alternative embodiment of a paddle wheel structure with an end wall thereof removed;

FIG. 10 is an enlarged fragmentary detail view of the alternative paddle wheel of FIG. 9 showing the manner in which paddle wheel blades associate with a hub member axially located and positioned between the blade end plates;

FIG. 11 is a diagrammatic view of the first stage of the rotating biological contactor embodiment shown in FIG. 1 in functional association with both an electric power drive subassembly and a fluidic power drive;

FIG. 12 is an end elevational view illustrating the profile of the end bulkhead of the FIG. 1 rotating biological contactor embodiment;

FIG. 13 is a view similar to FIG. 12 but illustrating the profile of an interstage bulkhead of the type used in the FIG. 1 rotating biological contactor embodiment;

FIG. 14 is a view similar to FIG. 12 but illustrating the profile of the opposite end bulkhead of the FIG. 1 rotating biological contactor embodiment;

FIG. 14A is a view similar to FIG. 12 but illustrating the profile of an alternative interstage bulkhead usable in the FIG. 1 rotating biological contactor embodiment;

FIG. 14B is a view similar to FIG. 12 but illustrating an alternative end bulkhead usable in the FIG. 1 rotating biological contactor embodiment;

FIG. 15 is an enlarged, fragmentary, perspective, detail view of a portion of a bulkhead structure suitable for use in the rotating biological contactor embodiment of FIGS. 1 and 2, some portion thereof being broken away;

FIG. 16 is a perspective exploded view of an alternative embodiment (compared to FIG. 2) of a shaft assembly usable in the practice of the present invention;

FIG. 17 is a perspective exploded view of the shaft assembly of FIG. 2 illustrating one manner of functionally associating this shaft assembly with a powerhead;

FIG. 18 is a perspective exploded view of an alternative embodiment (compared to FIG. 16) of a shaft assembly usable in the practice of the present invention;

FIG. 19 is a perspective exploded view of an alternative embodiment (compared to FIG. 2) of a shaft assembly usable in the practice of the present invention;

FIG. 37 is a view similar to FIG. 9 but showing an alternative embodiment of the paddle wheel of FIG. 8;

FIG. 38 is an enlarged, exploded, fragmentary view illustrating the manner in which the paddle wheel blades associate with a hub member in the paddle wheel embodiment of FIG. 8;

DETAILED DESCRIPTION (A) Illustrative RBC Embodiments

Figure 1:
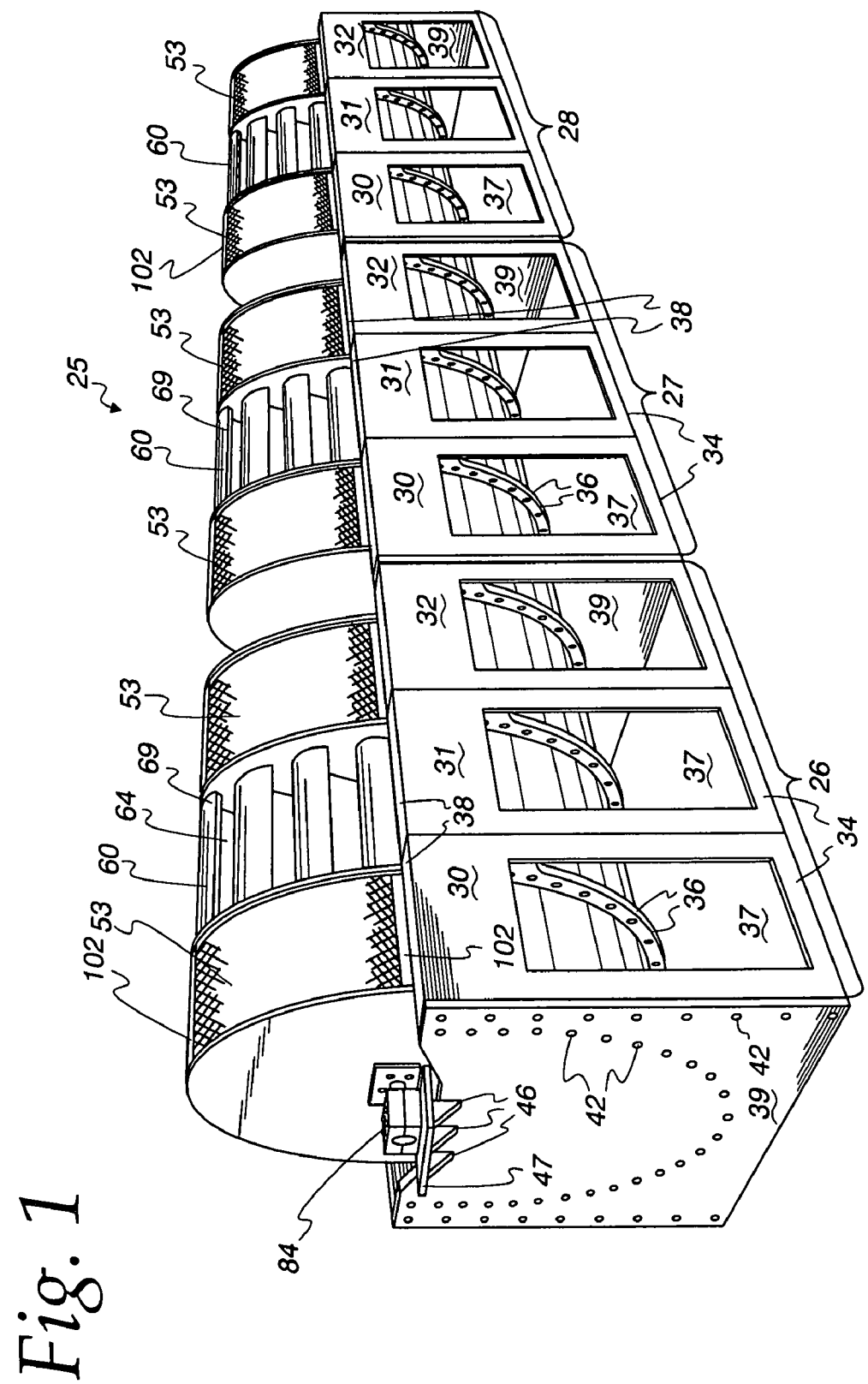
FIG. 1 is a perspective view of an illustrative embodiment of a multistage rotating biological contactor of the present invention which is comprised of an assembly of selected prefabricated components such as are provided by this invention.

Referring to the drawings, there is seen in FIG. 1 an illustrative assembled embodiment 25 of the inventive RBC. The RBC embodiment 25 includes three longitudinally adjacent, successive, functionally interconnected stages or wastewater treating compartments 26, 27, and 28. The internal and external side walls of each stage 26, 27, and 28 are each defined by three unitary, preformed and interconnected trough or tank sections 30, 31, and 32, respectively, which are each substantially identical to one another and arranged in longitudinally adjacent, aligned, interconnected relationship.

Figure 2:
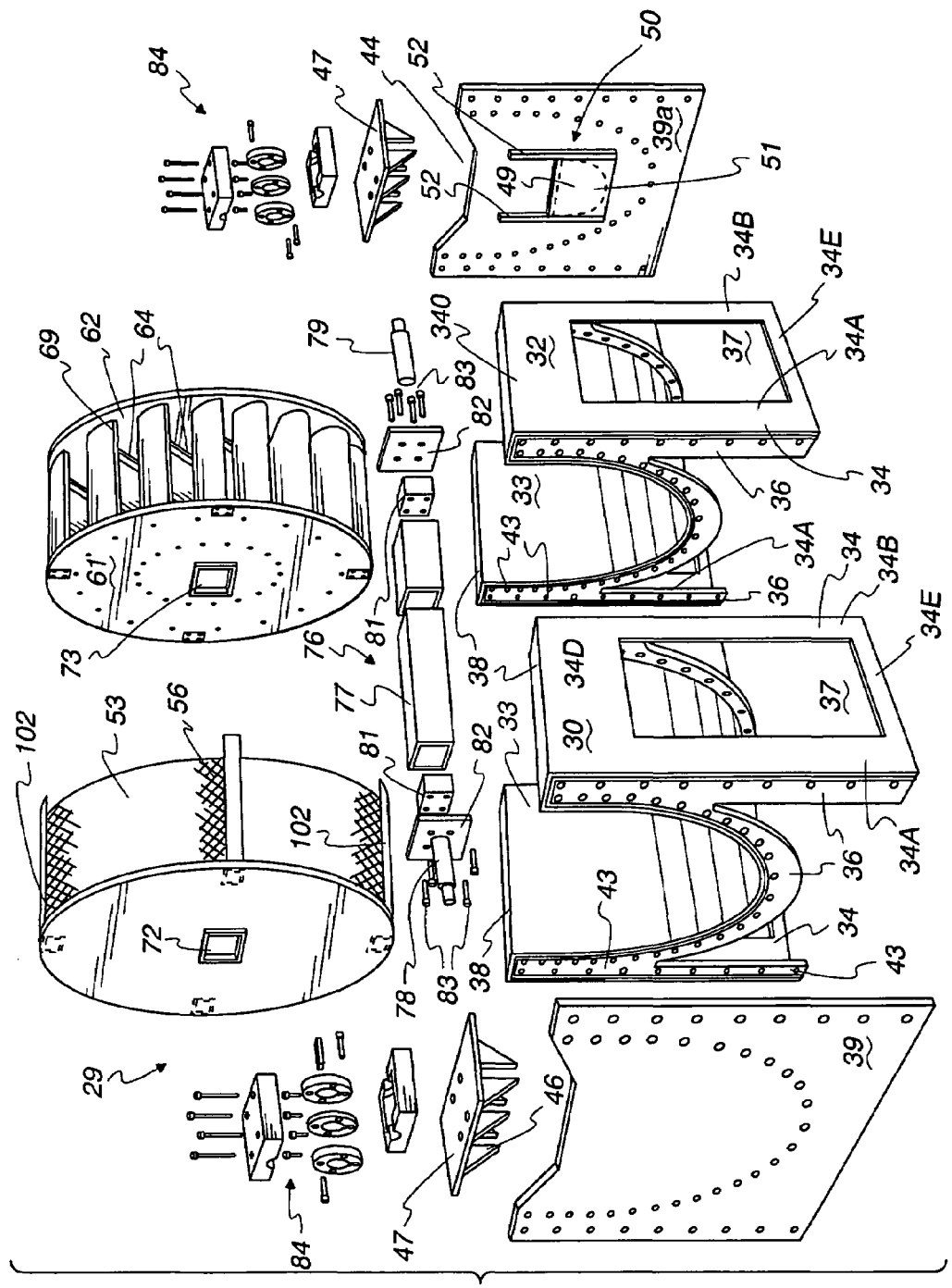
FIG. 2 is an exploded perspective view of an alternative embodiment of a first stage of the rotating biological contactor embodiment shown in FIG. 1 with mid-portions of the shaft section being broken away; and with the middle trough section and one drum-like contactor member being eliminated.

Referring to FIG. 2, an exploded view of an alternative RBC embodiment 29 is shown which incorporates a single stage. RBC embodiment 29 is similar to stage 26 of RBC embodiment 25 except that the middle trough section 31 is eliminated and one contactor member 53 (structure described below) is eliminated so that RBC embodiment 29 has a length that is approximately defined by trough sections 30 and 32. Components in RBC embodiment 29 which correspond to components in stage 26 in RBC embodiment 25 are similarly numbered for convenience in identification. Embodiment 25 or embodiment 29 can be provided with a cover or the like, not shown, if desired.

The medial wall portions 33 (see FIG. 2) of each trough section 30 and 32 preferably each have a hemicylindrical configuration. Various trough defining sections and subcomponents can be employed and are exemplified and described below.

What can be considered to be the open, vertical, opposed ends of the respective interconnected trough sections 30, 31 and 32 in each stage 26, 27 and 28 of RBC embodiment 25, and also the open vertical opposed ends of single stage 29 (FIG. 2) containing tank sections 30 and 32 are each provided with a bulkhead generally designated as 39. In the illustrative embodiments 25 and 29, the bulkheads 39 are illustratively substantially identical to one another, but, if desired, various bulkhead structures can be employed. Various exemplary bulkheads are described below.

Two contactor drum assemblies 53 are provided in each stage 26, 27 and 28 of RBC embodiment 25, and one contactor drum assembly 53 is provided in the single stage of RBC embodiment 29. The contactor drum assemblies 53 are here preferably and illustratively substantially identical to one another, but various contactor structures can be employed, if desired. However, if as in the prior art, a known type of preformed contactor structure is employed, and the contactor structure is associated with a drive shaft, then such an assembly must be preliminarily formed and the resulting assembly, because of bulk and weight considerations, must be lifted, moved into a desired position and engaged with a shaft by a hoist or the like. Such a prior art assembly is not suitable for usage when space is limited or where assembly of an RBC is to be accomplished by not more than two men with simple tools. Hence, a contactor drum structure 53 that is comprised of subcomponents that can be simply assembled at an RBC installation site, such as presently achieved, and as exemplified and described below, is presently preferred for use in an RBC embodiment in accord with the practice of the present invention.

In RBC embodiment 25, one paddle wheel assembly 60 is preferably provided in each stage 26, 27 and 28, as shown in FIG. 1, and, in RBC embodiment 29, one paddle wheel assembly 60 is preferably provided in the single stage. The paddle wheel assemblies 60 in RBC embodiments 25 and 29 are here preferably and illustratively substantially identical to one another, but, if desired, alternative paddle wheel structures can be employed, if desired. The paddle wheel assembly 60 is presently a preferred component for use in the practice of the present invention. However, if as in the prior art, a known type of paddle wheel structure is employed, and the paddle wheel structure is associated preliminarily with a drive shaft, then the resulting assembly, because of bulk and weight considerations, must be lifted and moved into a desired position by a hoist. Such a prior art assembly is not suitable for usage when space is limited or where assembly of an RBC is to be accomplished by not more than two men with simple tools. Hence, a paddle wheel assembly 60 that is comprised of subcomponents that can be simply assembled at an RBC installation site, such as presently achieved, and as exemplified and described below, is presently preferred for use in an RBC embodiment in accord with the practice of the present invention.

Each of the stages 26, 27, and 28 of RBC embodiment 25 and the stage of embodiment 29 is provided with a combination of sectionalized shaft assembly 76, bearing assemblies, and bulkhead support assemblies, such as shown, for example, in FIG. 2 and as described below. One shaft assembly 76 is preferably provided for each stage. The shaft assemblies 76 are here preferably and illustratively substantially identical to one another, but, if desired, alternative shaft assemblies can be employed. The shaft assembly 76 is presently a preferred component for use in the practice of the present invention. However, if as in the prior art, a known type of shaft assembly is employed, the shaft assembly may be very expensive and may be need to be preliminarily associated with other components, such as a contactor drum assembly or a paddle wheel assembly, and then the resulting assembly combination, because of bulk and weight considerations, must be lifted and moved into a desired position by a hoist or the like. Such a prior art assembly is not suitable for usage when space is limited or where assembly of an RBC is to be accomplished by not more than two men with simple tools. Hence, a shaft assembly 76 with associated bearing assemblies and bulkhead support assemblies that can be assembled at an RBC installation site, such as presently achieved, and as described below, is presently preferred for use in an RBC embodiment in accord with the practice of the present invention.

Relative to RBC embodiment 25, to assemble one stage, such as stage 26, two contactor drum assemblies 53 and one paddle wheel assembly 60 are utilized, in accord with a preferred practice of this invention, and as further described below. The components are assembled and concurrently associated with the mid-region 77 of a now preferred shaft assembly 76. Various techniques of assembly can be employed. Presently preferred techniques are described herein.

Various RBC embodiments can be assembled from components and subcomponents provided by this invention. These components can be prefabricated or comprised of prefabricated subcomponents. Although for convenience, illustrative RBC embodiments 25 and 29 are comprised of components such as, for example, the trough defining sections 30, 31 and 32. the bulkheads 39, the drum contactors 53, the paddle wheels 60 and the shaft assemblies 76, it will be appreciated that each of these components, if desired, can be comprised of assembled subcomponents, such as described herein below and as shown in accompanying FIGS. 1 and 2, for example. In general, an RBC embodiment, in accord with this invention, usually incorporates (a) at least one trough defining housing section, (b) at least two bulkhead members, (c) at least one a rotatable shaft assembly with bearing and support means, (d) at least one contactor drum, and (e) power means for rotating at least one shaft assembly. The power means usually involves either (a) a geared electric motor, or (b) at least one paddle wheel with associated paddle blade impelling means, or (c) both (a) and (b).

An RBC embodiment can incorporate more than one housing section with each housing section including a longitudinally extending trough defining portion. When more than one housing section is used, the adjacent sections are joined together so that their trough defining sections have their respective defined troughs in longitudinally aligned relationship.

An RBC embodiment incorporates at least two bulkheads, each one being disposed across a different opposed end of a trough defined by one or more housing sections.

An RBC embodiment incorporates a shaft means that extends longitudinally through the so defined troughs, the shaft means including bearing means and hearing means support means located at the bulkheads.

An RBC embodiment includes at least one contactor drum that is associated with the shaft means and is located at least partially in a trough.

An RBC embodiment includes power means for rotating the shaft means.

Preferably, an RBC embodiment includes at least one paddle wheel assembly which augments or replaces another power means, such as an electric motor, and the paddle wheel assembly includes auxiliary components that enable a fluid stream to be directed against blades of the paddle wheel assembly, thereby to rotate the paddle wheel and the shaft means which is associated with the paddle wheel and also at least one contactor drum which is also associated with the shaft means. At least one of the components of an RBC embodiment, particularly a contractor and/or a paddle wheel, is comprised of prefabricated subcomponents such as provided here. Preferably the components and the subcomponents are assemblable with one another at an RBC installation site. Preferably the assembly is accomplishable by no more than two men using simple tools.

(B) Trough Defining Components and Subcomponents

In embodiment 25, each trough section 30, 31, and 32 has, exteriorly of, but adjacent to, each side of its medial, trough defining wall portions 33, a pair of opposed side wall portions 34. At least one of these side wall portions is unitarily associated with the trough defining portion, each unitarily associated therewith. Each side wall portion 34 is generally flat and is preferably perpendicularly oriented.

Each side wall portion 34 includes access apertures; thus, for example, each side wall is preferably comprised of two longitudinally adjacent, spaced, parallel legs 34A and 34B (see FIG. 2) separated medially by an open gap or relatively large aperture 37. The upper and the lower portions of the legs 34A and 34B are integrally joined together by vertically adjacent, spaced, parallel cross braces 34D and 34E. Each side wall 34 extends downwardly from a different opposed upper side edge portions of the medial wall portions 33, and, in the trough sections 30, 31 and 32, the respective side walls 34 are each integrally associated with the medial wall portions. Opposite end regions of each trough section 30, 31 and 32 extend generally perpendicularly.

Trough sections can be comprised of a metal, preferably non-corroding, or preferably an insoluble plastic, such as a thermosetting plastic like a glass fiber filled polyester or the like, or a thermoformable plastic such as a polyvinylchloride or the like. Combinations and mixtures of metals and plastics can be employed. For ease in assembly, combinations and subcomponents that are relatively light in weight are preferred.

The large aperture 37 defined in each side wall portion 34 permits convenient assembling or disassembling of tank sections 30, 31, and 32 and of RBC embodiment 25, enables access to bottom regions of tank sections 30, 31, and 32 and to side regions of bulkheads 39, and thus avoids what could otherwise be difficult, sometimes otherwise unsolvable construction and maintenance problems which can arise particularly in a limited environmental space. Without aperture 37, an assembly or subassembly of an RBC embodiment 25, for example, might have to be elevated in order to, for example, carry out component assembly and RBC fabrication at a site which has insufficient overhead clearance for such an elevation. Each aperture 37 can be configured as desired, but is here illustratively and preferably rectangular. A door (not shown) may be provided for each aperture 37, if desired.

In each trough section 30, 31, or 32, a relatively small, rectangular, horizontally oriented, flat top 38 interconnects integrally the generally opposed (relative to the other thereof), longitudinally extending straight upper end portions of each medial wall portion 33 with the longitudinally extending straight upper end portions of each adjacent exterior side wall 34. If desired, the walls 33, 34 and the top 38 can be arranged to have various alternative shapes and spatial orientations.

The respective opposite end edge portions of each tank section 30, 31, and 32 are provided with an out turned or down-turned (depending on and relative to the interior surface location of the medial wall portion 33), continuously extending flange 36 (an in-turned flange, not shown, would be likely to cause the collection of solids behind each flange inside a trough section). Longitudinally adjacent trough sections are conveniently bolted together using adjacent flanges 36 and nut and bolt assemblies preferably with sealant deposited between adjacent flanges 36.

While trough sections of different lengths (but of common widths) are theoretically feasible for use in an RBC embodiment, trough sections of fixed length are here preferred because flexibility of RBC design is thereby enhanced, as desired. For example, by fixing the longitudinal length to each trough section 30, 31 and 32 at 0.7 meters (about 24 inches), restricting the longitudinal thickness of each of the contactor drum members 53 to either about 0.3 meters (about 12 inches) or about 0.6 meters (about 24 inches) and restricting the longitudinal thickness of each paddle wheel 60 to about 0.3 meters (about 12 inches), flexibility in assembly design is enhanced. For instance, in a design having three trough sections per stage (about 72 inches in longitudinal length), by using two contactor drum members 53 of each about 24 inches in longitudinal length per stage 26, 27, 28, one located on either side of the paddle wheel 60 (a combined width of about 60 inches), there is provided 6 inches at each end of a stage assembly which is useful for achieving space for the bearing assembly 84 and support shelf structure 47 thereby to keep the contactor drum 53 on each side on the paddle wheel 60 from rubbing against a bulkhead 39. It also provides a little space between two longitudinally adjacent stages such as stages 27, 28 or stages 26, 27 for a user to have access to the bearing assembly 84 (described below) for equipment assembly or maintenance purposes. Also, this arrangement allows for the paddle wheel 60 to be replaced by a contactor drum 53 if, for example, it is desired to provide only geared motor propulsion for all interconnected shaft assemblies 76 without altering general assembly dimensions. This arrangement is, for example, illustrated in FIG. 45. For RBC embodiments in accord with the present invention, contactor drum longitudinal widths of about 24 inches are convenient and commonly preferred. For purposes of convenience in the accompanying Figures, the contactor drum widths are generally depicted as having narrow widths, for example, widths of perhaps about 12 inches in relation to other components. In general, the exemplified components of an RBC embodiment should not be regarded as being drawn to scale.

Figure 23:
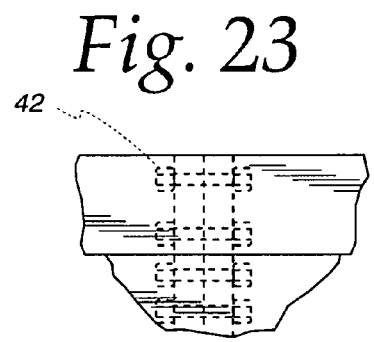
FIG. 23 is an enlarged, fragmentary, detail view illustrating the manner in which two trough defining sections such as shown in FIG. 20 are connectable together in end-to-end adjacent relationship.
Figure 21:
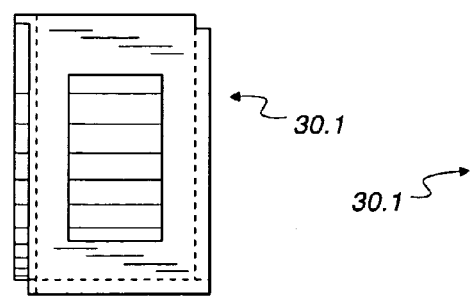
FIG. 21 is a left side (relative to FIG. 20) elevational view of the trough defining section of FIG. 20.
Figure 22:
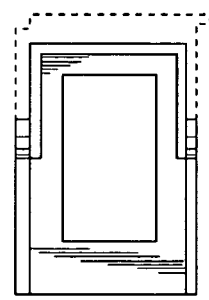
FIG. 22 is a right side (relative to FIG. 20) elevation view of the trough defining section of FIG. 20 separated from the right side support structure.

Various structures and arrangements for a trough forming section can be utilized. For convenience and versatility in fabrication of an inventive RBC structure, a trough section, such as the above described trough forming section 30, is separated into two portions, such as shown, for example, in FIG. 20, where a side wall 34.1 is formed separately from the medial wall portion 33.1 in a trough forming section 30.1. The opposing side wall 34.2 (relative to side wall 34.1) remains integrally formed with the opposite side of the medial wall portion 33.1, as in the trough section 30. Here, the upper opposite end portions of side wall 34.1 are each configured to slidably engage with and between upper opposite side portions of the adjacent medial wall portion 33.1 with the top flattened edge portion of the side wall 34.1 being nestably received beneath the top flattened edge portion of the adjacent side portion of the medial wall portion 33.1. To rigidify and stabilize the engaged side wall 34.1 relative to the medial wall portion 33.1, nut and bolt assemblies 42 or the like can be longitudinally extended through aligned apertures defined between the assembled medial side wall 33.1 and the side wall 34.1, as illustrated, for example, in FIG. 23. Opposite end portions of a section 30.1 are preferably configured, as shown, for example, FIGS. 21 and 22, so as to facilitate an assembled engagement of longitudinally adjacent trough forming sections 30.1 together.

Figure 25:
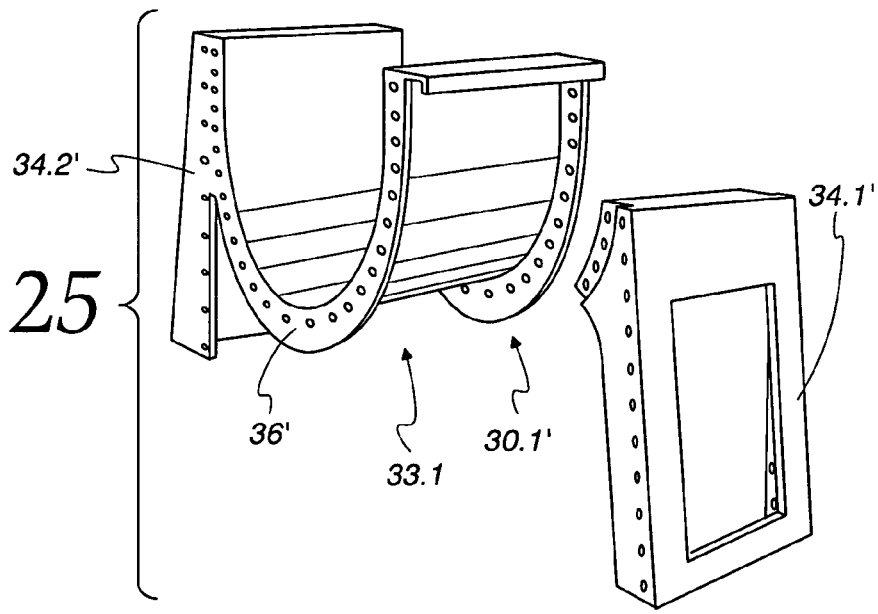
FIG. 25 is an exploded perspective view similar to FIG. 20 but showing an alternative embodiment of a trough defining section comprised to two portions.

An alternative trough forming structure comprised of a side wall 34.1' that is formed separately from the medial wall portion 33.1' in a trough forming section 30.1' is illustrated, for example, in FIG. 25. In the trough forming section 30.1', the opposing side wall 34.2' (relative to side wall 34.1') remains integrally formed with the opposite side of the medial wall portion 33.1'. Here, the upper opposite end portions of the side wall 34.1' are configured to engage upper side portions of the flange 36' that is provided on one end of the medial wall portion 33.1'. A downturned and inturned flange on the upper outside edge of the medial wall portion 33.1' is adapted to be adjacent the upper outside edge region of the side wall 34.1' during engagement of side wall 34.1' with medial side wall portion 33.1'. To rigidify and stabilize the engaged side wall 34.1' relative to the medial wall portion 33.1', nut and bolt assemblies 42 or the like (not detailed) can be longitudinally extended through aligned apertures defined between the assembled and adjacent portions of the medial side wall 33.1' and the side wall 34.1 (see FIG. 23, for example). To engage longitudinally adjacent trough forming sections 30.1', the flange 36' is employed in combination with the side walls 34.1' and 34.2' using nut and bold fastening means or the like, not detailed.

Figure 27:
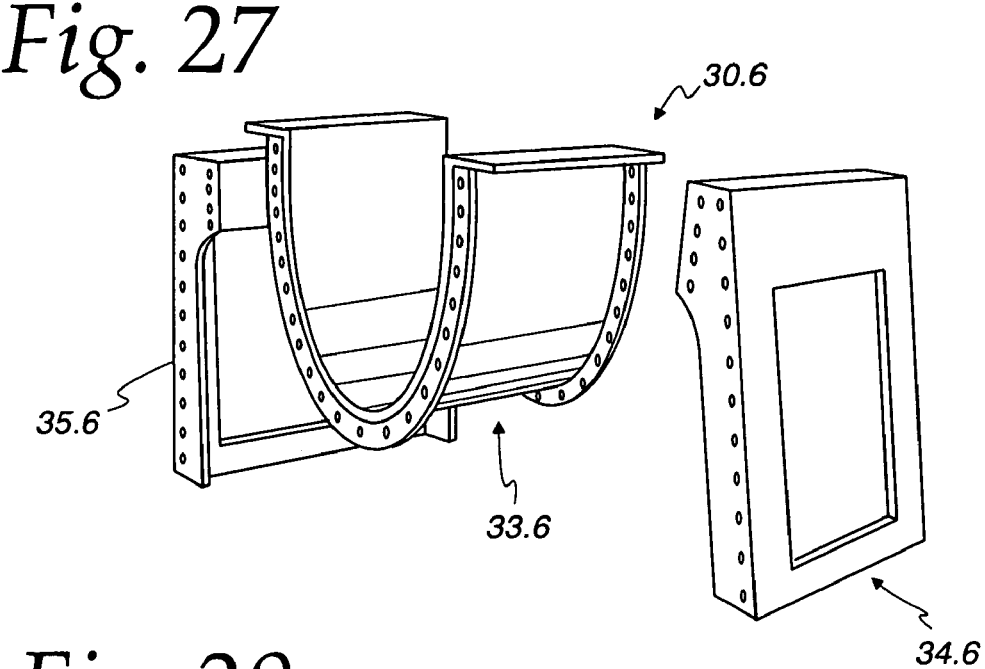
FIG. 27 is an exploded perspective view of an alternative trough defining section embodiment (compared, for example, to the embodiment shown in FIG. 25) where the trough mid region is separately from each of the opposing side supports of the trough defining section.
Figure 29:
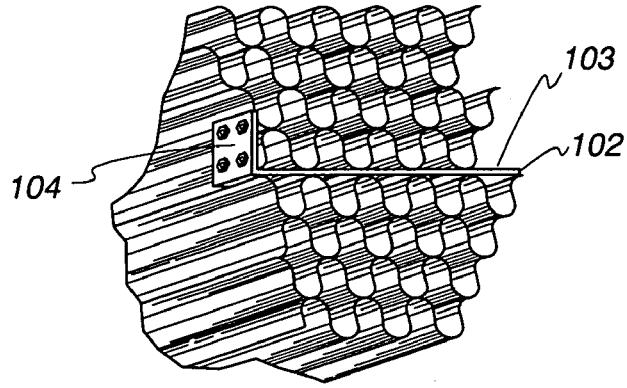
FIG. 29 is a view similar to FIG. 6 but showing the bracket of FIG. 28 turned 90° in a contactor drum relative to its orientation in the contactor drum employed in the rotating biological contactor embodiments of FIGS. 1 and 2.
Figure 30:
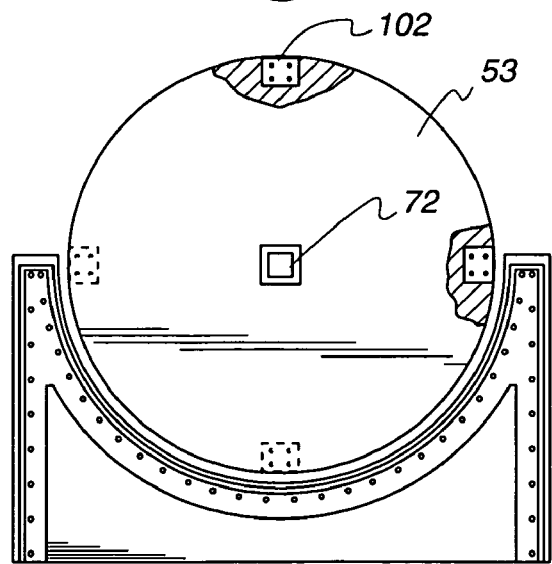
FIG. 30 is a view similar to FIG. 5 but showing a preferred manner in which the brackets of FIG. 28 oriented as shown in FIG. 29 are connected to an end plate of the contactor drum assembly.
Figure 46:
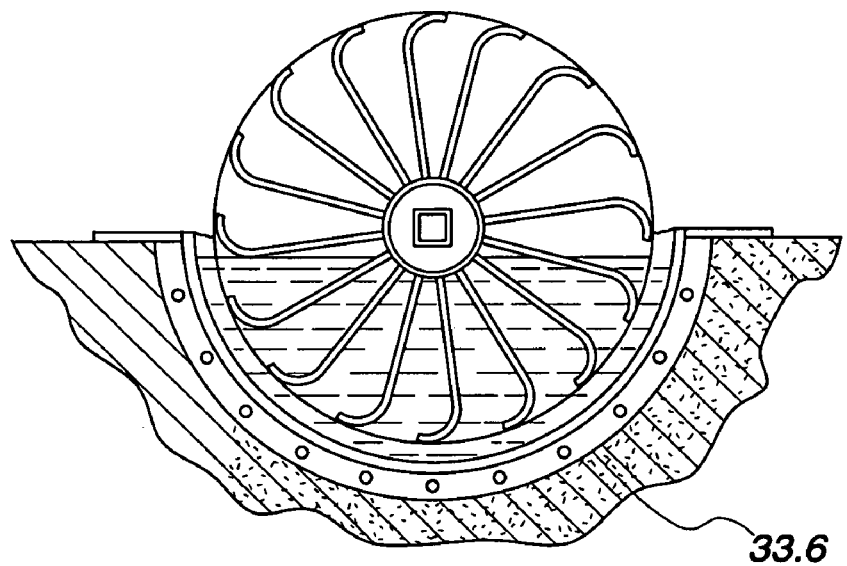
FIG. 46 is an illustrative side elevational view of a rotating biological contactor embodiment located in a pit, this rotating biological contactor incorporating the trough defining section of FIG. 27 (but without the side walls), and the combination of contactor drums and paddle wheel of FIG. 39, the adjacent ground region being shown in section.
Figure 47:
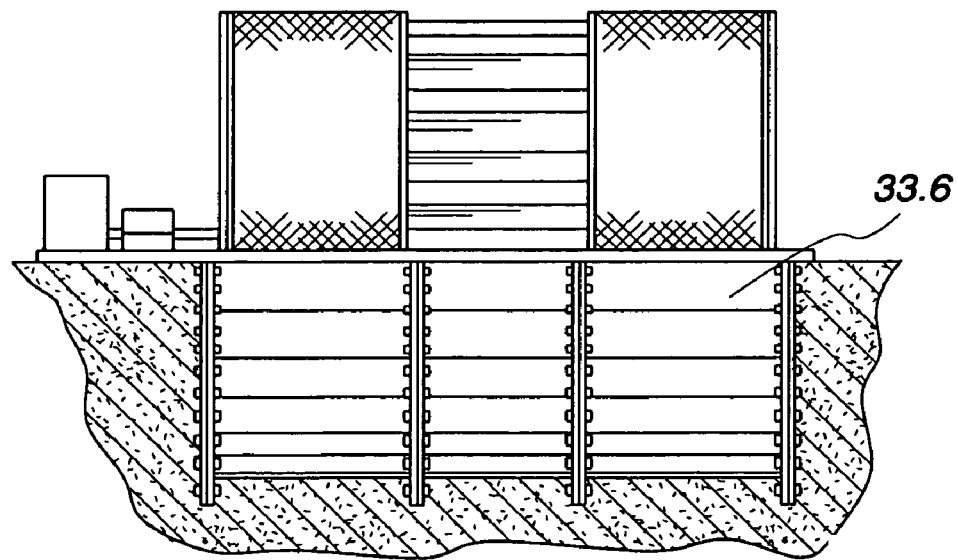
FIG. 47 is a vertical, transverse sectional view through the mid-region of the paddle wheel in the RBC embodiment of FIG. 46.

An illustrative trough defining section 30.6 is provided as shown in FIG. 27 wherein the medial side wall portion 33.6 is separate from, but connectable with, each of the opposing side legs or walls 34.6 and 35.6. The medial side portion 33.6 can be used in an RBC assembly without the side legs when the medial side portion 33.6 is utilized in a cement defined cavity such as illustrated, for example, in FIGS. 46 and 47.

(C) Bulkheads

In the embodiments of FIGS. 1 and 2, one bulkhead 39 is conveniently and preferably mounted to the open end of section 30, and a second bulkhead 39 to the section 32 at the opposite end of the embodiment 25 or 29, both end bulkheads 39 being mounted to the adjacent sections 30 and 32 by means of, for example, a plurality of stainless steel nut and bolt assemblies 42 (using the flanges 36), if desired, or like fastening means.

Intervening between opposite ends of the trough defining section(s), other bulkheads can be utilized between trough defining sections. For example, the bulkhead 39 that is located between each of the respective adjacent tank sections 32 and 30 of stages 26/27 and 27/28 of embodiment 25 is conveniently and preferably mounted to these respective tank sections 32 and 30 by means of, for example, a plurality of preferably stainless steel nut and bolt assemblies 42 (preferably using the flanges 36) or the like. To provide a sealing engagement between each of the bulkheads 39 and adjacent portions of the sections 30 and 32 in embodiments 25 and 29, a conventional sealant means, such as a gasket strip 43 (see FIG. 2), is continuously preferably extended initially as a ribbon or the like in conveniently initially applied in contact with the flanges 36. Thus, in effect, each stage in an embodiment of an inventive RBC such as embodiment 25 is longitudinally begun and ended (defined) by a pair of longitudinally spaced, parallel bulkheads, such as a bulkhead 39 pair or the like.

As shown in FIG. 2 for RBC embodiment 29, a terminal bulkhead can be modified, if desired, to provide an apertured bulkhead, such as the bulkhead 39a. Bulkhead 39a is provided with an aperture 49 (shown in phantom), here preferably and illustratively rectangularly shaped. Aperture 49 can be provided with a valve, such as, for example, a simple gate valve 50 having a vertically slidable, rectangularly configured gate valve plate 51 which can overfit the aperture 49 and which has each of its opposite side edge portions engaged with a different vertically extending track defined in each of a different one of a pair of spaced, parallel channel members 52 that are each affixed (by screws, adhesive or the like, not detailed) to respective side portions of the bulkhead 39a. Thus, the opposite side edge portions of the valve plate 51 are vertically slidable along each of the respective channel members 52 so that the aperture 49 can be closed or adjusted to some desired opening by the vertical position of the valve plate 51.

A bulkhead can be comprised of metal or plastic or a combination thereof, as those skilled in the art will appreciate. An apertured bulkhead can be variously structured, as desired. The relationship between the sections 30, 31, and 32 and an associated pair of bulkheads 39 is such that a hemicylindrical tank or trough region is defined between each of the longitudinally adjacent but spaced bulkheads 39. Profiles of various bulkheads 39 are illustrated in FIGS. 12–14B. FIG. 12 shows for comparison purposes the profile of bulkhead 39. FIG. 13 illustrates the profile of an exemplary intertrough or interstage bulkhead. FIG. 14 illustrates the profile of an alternative bulkhead 39b relative to bulkhead 39a. The bulkhead 39b illustratively has a plumbing fitting (not detailed) at an exit portal near or just above its bottom center. Bulkhead 39c of FIG. 14A illustrates a reinforced intermediate bulkhead that can support a bearing block subassembly 84 and associated shaft assembly 76, as described herein. Bulkhead 39d of FIG. 14B illustrates a reinforced end bulkhead that can support a bearing block subassembly 84 and associated shaft assembly 76, as described herein.

Preferably, a bulkhead, such as a bulkhead 39, 39a, 39b, 39c or 39d, has defined medially in its top edge region a laterally broad notch or depression 44 that has a horizontally extending bottom surface. The depression 44 is useful for support purposes, as herein explained. The depression 44 can be variously utilized.

For example, each depression 44 is adapted to receive over edge adjacent surface portions thereof a plurality of side brace supports 46 (see FIG. 2) that are suitable for the support of a shelf structure 47. In RBC embodiments 25 and 29, a shelf structure 47 is placed on each bulkhead 39. Each shelf structure 47 preferably has, as shown, a set of six such brace supports 46, the positioning of the brace supports 46 being such that there are three pairs of brace supports 46 located at each bulkhead 39, the members of each pair being in opposed relationship relative to each other on each side of each bulkhead 39 at depression 44. Each brace support 46 is illustratively triangularly configured and all brace supports are conveniently similarly sized. Each brace support 46 has one side leg that is adjacent to the bulkhead 39 and extends vertically, a second side leg that extends horizontally but perpendicularly relative to the one leg side, and a third or hypotenuse side extending diagonally between outer end portions of each leg side. Over upper surface portions of each of the horizontally extending leg sides of each set of six brace supports 46 is positioned a flat, preferably rectangularly sided shelf member 47 that is secured to the set of brace supports 46 by adhesive, stainless screws or the like. The shelf member 47, the brace supports 46, the bulkhead 39 and the depression 44 cooperate to provide support of a bearing block subassembly 84, such as hereinbelow described.

For another example, in place of the set of brace supports 46 for each shelf member 47, a cross sectionally square or rectangular tube member 150 can be employed, such as, for instance, a length of a mid portion 77 of a shaft assembly 76 or the like. The tube member 150 (see, for example, FIGS. 14A, 14B, and 44) is located horizontally against at least one side and preferably against opposite sides, of the bulkhead 39. One side of the tube member 150 is bonded by adhesive or the like to adjacent portions of the bulkhead surface 39, and the adjacent side of each tube member 150 is preferably located so as to be flush with the bottom of each adjacent depression 44. When a shelf support member 47 is extended and positioned over the depression 44, it is thus supported by the adjacent side surface portions of two tube members 150.

To counteract a possible tendency for an end bulkhead in an operating RBC embodiment to bulge outwards in response to internal water pressure, particularly when the width of a bulkhead 39 is at least about 72" or greater (about 96" being a particularly common or typical bulkhead width), the tube member 150 on the exterior side surface of an end bulkhead can be extended laterally so that the tube member 150 extends transversely across the width of a bulkhead 39, thereby bracing and reenforcing the bulkhead 39 in its upper portions where the effect of water pressure is greatest.

As those skilled in the art will appreciate, many different alternative arrangements and configurations are possible to achieve a support platform at each bulkhead, as desired, for a bearing block subassembly 84.

One presently preferred internal structure for a bulkhead 39 is illustrated in FIG. 15. Bulkhead 39 has a high performance polyvinyl chloride core 109. Core 109 on each opposed face thereof is provided with three layers 110, 111, and 112. The layers 110, 111, and 112 each comprise a high performance, bi-directional fiberglass mat on a polyester or a polyvinylester matrix. This bulkhead 39 is preferably produced by the vacuum infusion forming method. Those skilled in the art will readily appreciate that various structures and construction techniques can be employed in the assembly of a bulkhead. Owing to differences in fabrication procedures, sometimes closer dimensional tolerances can be achieved using thermoformable plastic materials than thermosettable plastic materials, as those skilled in the art will appreciate.

Figure 20:
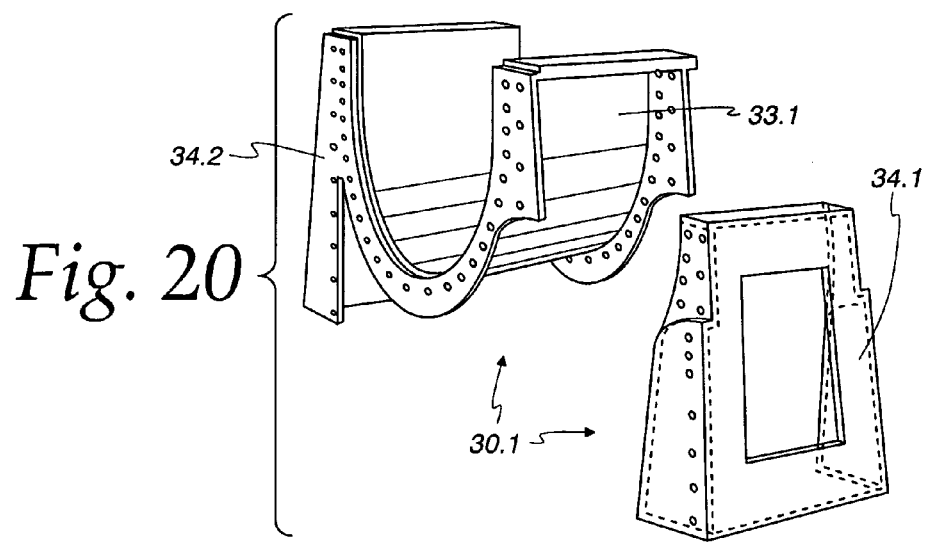
FIG. 20 is an exploded perspective view of an alternative embodiment (compared to the embodiment shown in FIGS. 1 and 2) of a trough defining section comprised of two portions.
Figure 24:
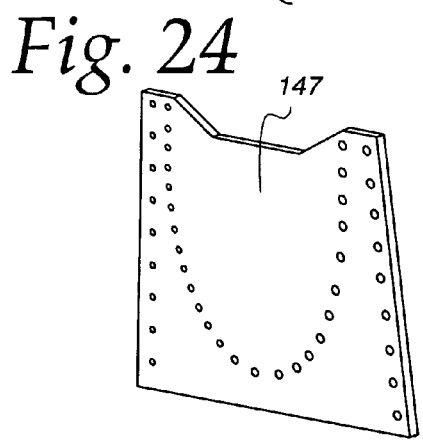
FIG. 24 is a perspective view of a bulkhead that is usable in combination with one end of a trough defining section combination such as shown in FIG. 20.

A bulkhead 147 that is suitable for use with the trough forming section 30.1 of FIG. 20 and the trough forming section 30.1' of FIG. 25 is illustrated in FIG. 24. This bulkhead 147 is regardable as being generally trapezoidally configured and its downwardly and outwardly sloping opposite sides are adapted to mate with the correspondingly sloping sides of the supporting leg members 34.2 and 34.1 of the trough forming section 30.1.

Figure 26:
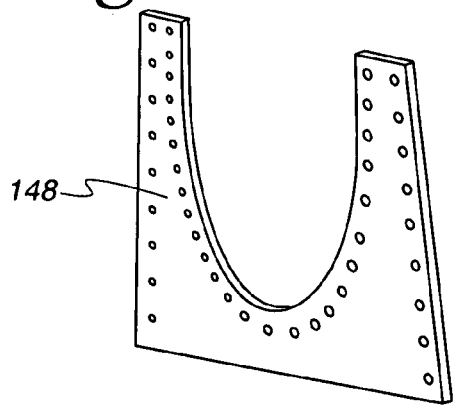
FIG. 26 is a perspective view of a bulkhead that is similar in edge profile to that shown in FIG. 24 but which is suitable for connection between two adjacent ends of a pair of trough defining section combination to provide support and to extend the internal length of a trough defined by this pair of adjacent trough defining sections.
Figure 32:
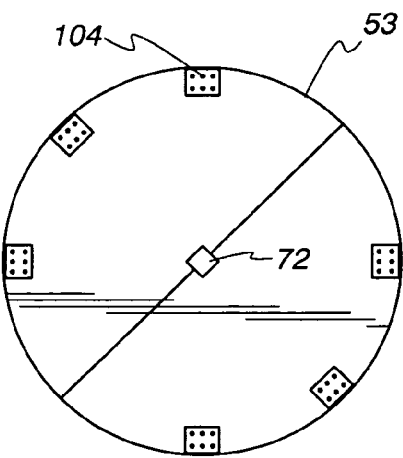
FIG. 32 is a side elevational view of an alternative embodiment of a contactor drum that is assembled from subcomponent half-portions as in FIG. 31 but wherein six brackets of the type shown in FIG. 28 located at circumferentially equally spaced positions are employed.

A support bulkhead 148 is illustrated in FIG. 26 that is suitable for use in supporting longitudinally adjacent trough sections relative to an underlying ground or floor surface. The bulkhead 148 is located between two adjacent trough forming sections, such as section 30.1' of FIG. 25 is shown in FIG. 26. The internal surface contour of this bulkhead 148 preferably matches the internal contour of each of the longitudinally adjacent pair of trough defining sections 30.1' with the bulkhead 148 connected therebetween and functioning to support the pair of sections 30.1'. Thus, the length of a particular trough defining section need not fix the length of a stage.

(D) Contactor Drum Assemblies and Subcomponents

As shown in FIGS. 1, 2, 5 and 6, the contactor drum embodiment 53 is usually comprised of one circular end plate 54 and a plurality of associated, longitudinally (relative to the RBC embodiment) adjacent, preferably corrugated circular sheets 56 that comprises the contactor medium or core. Various construction materials can be employed. One present preference is for each of the sheets 56 to be comprised of polyvinyl chloride and for each of the plates 54 to be comprised of glass-filled polyester or polyvinylchloride.

Preferably, the number of sheets 56 in a contactor member 53 ranges from about 4 to about 40 although a contactor member 53 can contain a fewer or greater number of sheets 56, if desired. Preferably, each sheet 56 has a relatively rigid corrugated configuration. The sheets 56 are conveniently and preferably bonded together at points of contact therebetween by conventional means, such as heat sealing, adhesive or the like. Factors such as the number of sheets, the size of the corrugations, the manner in which the corrugations are formed and arranged between adjacent sheets, and the like, affect the flow rate and volume of water that can pass through the channels or passageways 57 which transversely extend through a contactor drum 53, as those skilled in the art will readily appreciate. For convenience, the group of corrugated sheets 56 used in a given contactor member 53 can be regarded as a core or bundle 55 (see FIG. 31 or FIG. 43) although a given bundle 55 can contain more than one group of sheets 56.

A contactor drum 53 has an axial and longitudinally extending (relative to an incorporating RBC embodiment) cross-sectionally square shaft-receiving aperture 72 defined centrally through the end plate(s) 54 and the sheets 56 of a bundle 55.

Figure 6A:
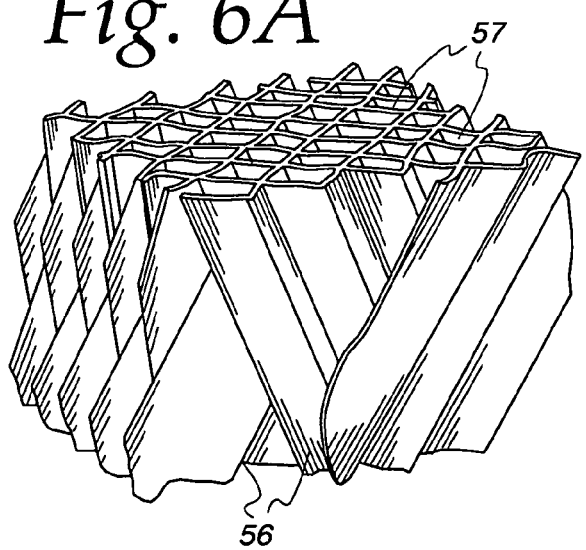
FIG. 6A is an enlarged, fragmentary, perspective detail view of the interior region of an alternative arrangement for corrugated layers in a FIG. 5 contactor drum.

In a contactor medium, such as a bundle 55, the corrugations in the individual sheets 56 may extend generally straight and transversely in and across a contactor drum member 53, such as shown in FIG. 6, for example. Preferably, in a given contactor drum member 53, the individual sheets 56 have similar corrugations. The relationship between individual adjacent sheets 56 in a bundle 55 can be such that the apexes and adjacent valleys of the individual corrugations defined in and across one sheet member 56 correspond to and are adjacent to those in the adjacent sheet member 56 (see FIG. 6). Commonly, in a contactor medium, in individual sheets 56, the corrugations of one sheet 56 may, if desired, extend at an angle, such as, for example, about 60°, relative to the corrugations in an adjacent sheet 56, as illustrated, for example, in FIG. 6A.

Depending upon factors such as convenience and availability, those skilled in the art will appreciate that a contactor drum 53 can have a core 55 that is itself comprised of separately fabricated bundles of corrugated sheets 56 which are commercially available, and, when this is accomplished, preferably the bundles 55 comprise a resulting composite of bundles which are arranged in a stacked manner preferably so that the corrugations in individual sheets 56 tend to extend in a generally common direction. A resulting multi-component composite can be held together by straps, flat brackets, or the like, as desired. Preferably, and conveniently, in a bundle of sheets, the corrugation ridges (or apexes) in one sheet 56 are bonded (by heat sealing, adhesive, or the like) to adjacent contacting ridges of the adjacent sheet 56, thereby to define a plurality of adjacent, parallel passageways or channels 57 (see, for example, FIG. 6) that extend chord-like transversely across and through a contactor drum member 53 from one perimeter face or edge portion to an opposite perimeter edge portion.

A group of separately fabricated bundles 55, each comprised of corrugated sheet members placed in a bundle composite of selected dimensions, can be cut with a band saw or the like so that the resulting assembled core structure 55 has a desired peripheral configuration, for example, a drum-like or (preferably) partially drum-like, or (more preferably) hemi-circular configuration that is adapted for use as a subcomponent in a drum member 53. In accord with the invention, a present preference is to form and cut a composite so as to provide initially a hemi-cylindrical drum member portion that has both a circular perimeter portion that extends about 180° and also a flat surface portion that extends diametrically between circular perimeter opposite ends and corresponds to the diameter in a desired drum member 53 (see FIG. 43) Each diameter edge surface has defined therein at its mid-region a preferably right-angled notch or cut shape which corresponds to about one half of a preferred shaft mid-portion 77 taken diagonally. To assemble a contactor member 53, the diameter of each one of a pair of these so formed hemi-cylindrical members is then brought together with the other preferably about a shaft mid-portion 77, thereby locating the central core of a drum member 53 on and about a shaft assembly, such as shaft assembly 76, thereby to define a complete contactor drum member 53. Conveniently and preferably, halves of the drum member 53 are assembled about a shaft mid-portion 77 of a shaft assembly 76 in an RBC embodiment that is being assembled. The assembly is conveniently accomplished by two men who can work cooperatively in a confined area with simple tools. Conveniently and preferably, a shaft assembly 76 is already assembled and located in an RBC embodiment that is being assembled conveniently and preferably using components and subcomponents such as are provided by the present invention.

Each of the opposed, spaced, parallel sides of a drum member 53 core can be associated with an end plate that is generally designated as 54, as may be desired, depending upon the particular RBC design configuration. The end plate 54 can be variously structured; it can be, for example, a unitary, flattened disk-like structure, as illustrated, for example, in FIGS. 1 and 2, or, for example, an end plate assembly 54.1 that is comprised to two interconnected rigid half disk-like members 54.1A and 54.1B (a present preference) that meet along a common diameter, as illustrated, for example, in FIG. 31 or FIG. 35. When two such half-disk like members are employed, preferably mid-way along the diameter of each half-disk, a right angled notch is cut or otherwise defined therein, each notch preferably corresponding to about one half of a preferred shaft mid-portion 77 taken diagonally. The so formed end plate 54.1 can be assembled with other components and subcomponents of an RBC embodiment that is being assembled conveniently and preferably using components and subcomponents such as are provided by the present invention.

The half-disk like members 54.1A and 54.1B can be variously comprised and assembled. One can provide each mid-diameter notch with a mating, angular steel perimeter insert 135 (see, for example, FIGS. 31, 43, and 45) that is sized to slidably engage with and over a region of mid-portion 77 so that a pair of inserts 135 extends about a shaft mid portion 77. Screw means or adhesive means (not detailed) can be provided optionally to associate together adjacent end portions of each pair of steel perimeter inserts 135 and/or to associate a steel perimeter insert 135 with adjacent portions of a disk-like member 54.1A and 54.1B.

Figure 31:
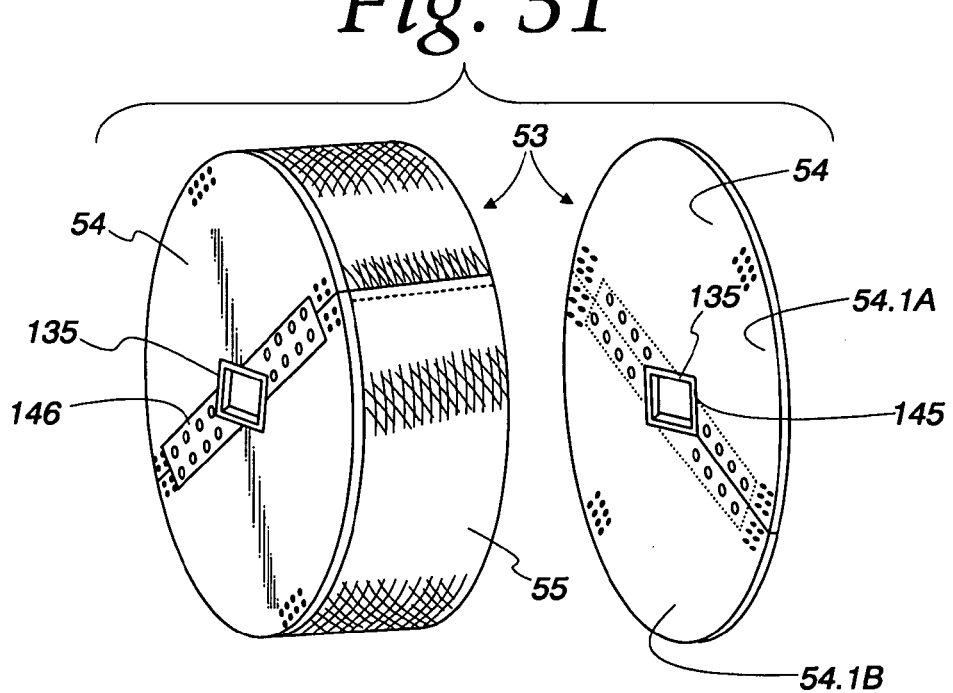
FIG. 31 illustrating a contactor drum such as shown in FIG. 30 wherein the end plates 54 are each assembled together along their common diameter from subcomponent half portions using a connecting plate, one end plate being illustratively shown in exploded relationship relative to the contactor drum core and at an optional rotation of 90 degrees.
Figure 43:
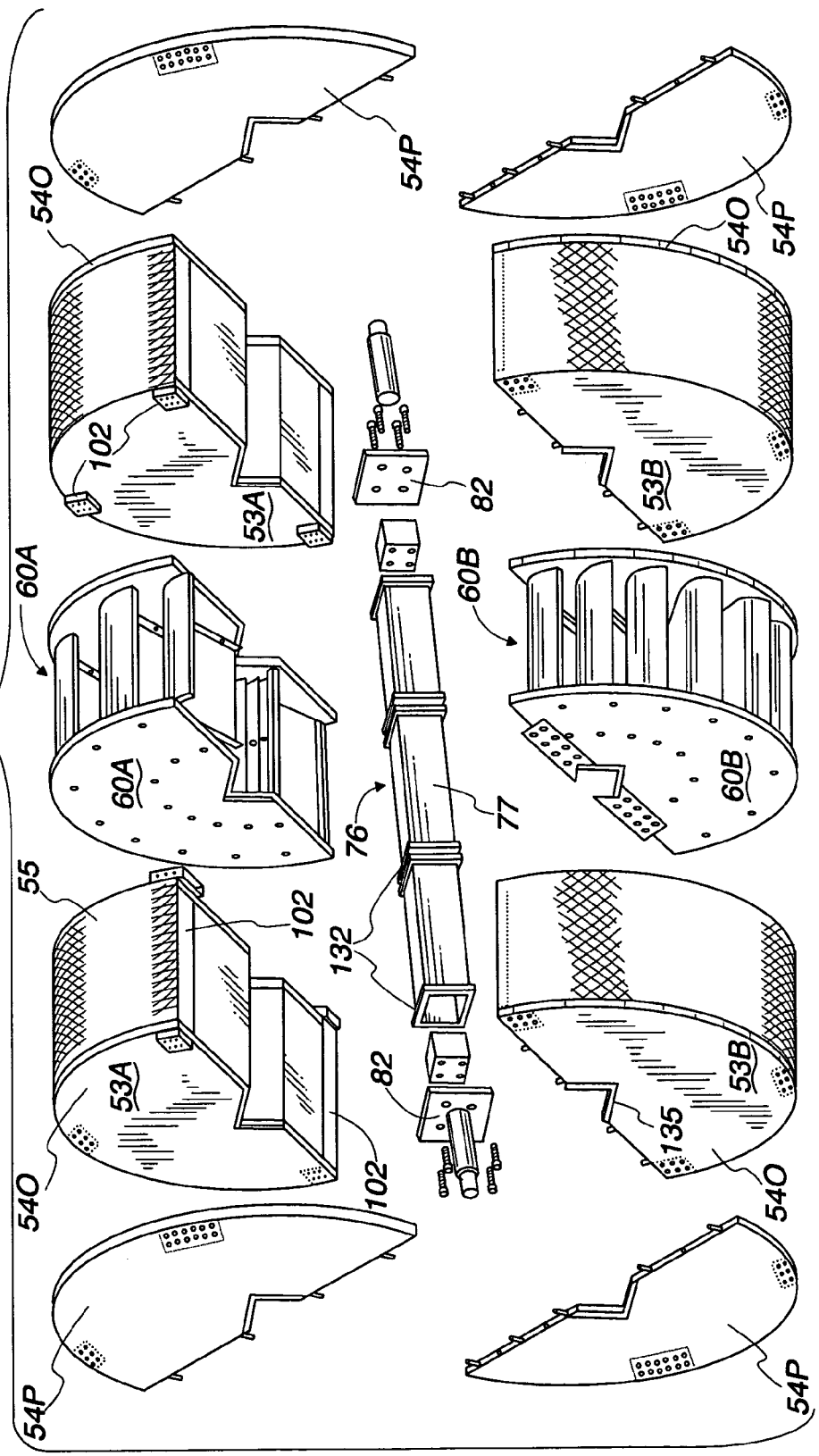
FIG. 43 is an exploded perspective view of a combination of two contactor drums and an intervening paddle wheel with a shaft assembly, each component being assembled from subassemblies, this combination being comparable in part to the combination shown in the stages of the FIG. 1 rotating biological contactor embodiment.

As shown in FIG. 31, for example, a pair of flattened fastening plates 146 can be extended over the diameter and adjoining adjacent regions of a combined pair of half-disk like members 54.1A and 54.1B. Each opposite side portion of each plate 146 can be connected to or associated with the associated such half-disk member 54.1 or the like by screws or the like (not detailed). The inner end portions of each plate 146 can be notched to fit adjacently relative to the center notch or square shaft aperture of the assembled plate 54.1. After being brought together with a bundle 55 therebetween, the half-disk like members 54.1A and 54.1B can be mounted by screws or the like to end regions of the retainer bracket 102, as indicated in FIG. 43, that extends over the bundle 55, thereby to associate the spaced, parallel end plates 54.1 with core portions of a drum member 53. A plate support is preferably located on each opposite side of a contactor drum 53 when the drum 53 is used separately from, for example, a paddle wheel 60, about a shaft mid portion 77 (see FIG. 31).

Figure 33:
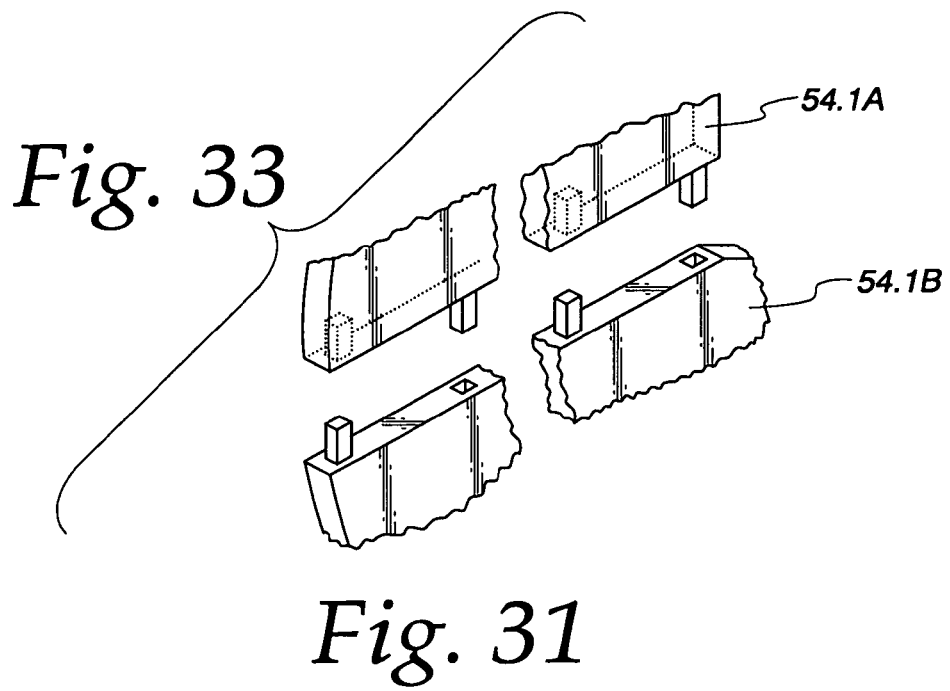
FIG. 33 is a fragmentary, perspective view illustrating one manner in which diametrical edge portions of the end plates of a contactor drum such as shown in FIG. 31 may be associated together.
Figure 35:
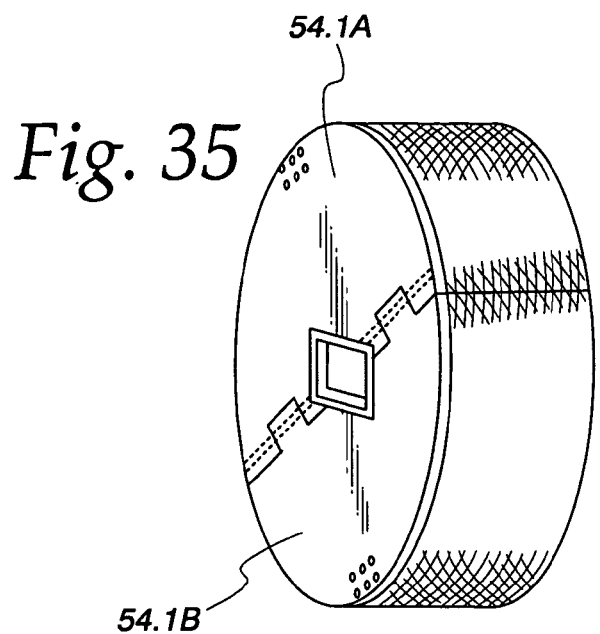
FIG. 35 is a fragmentary, perspective view illustrating a third manner in which diametrical edge portions of the end plates of a contactor drum such as shown in FIG. 31 may be associated together.
Figure 36:
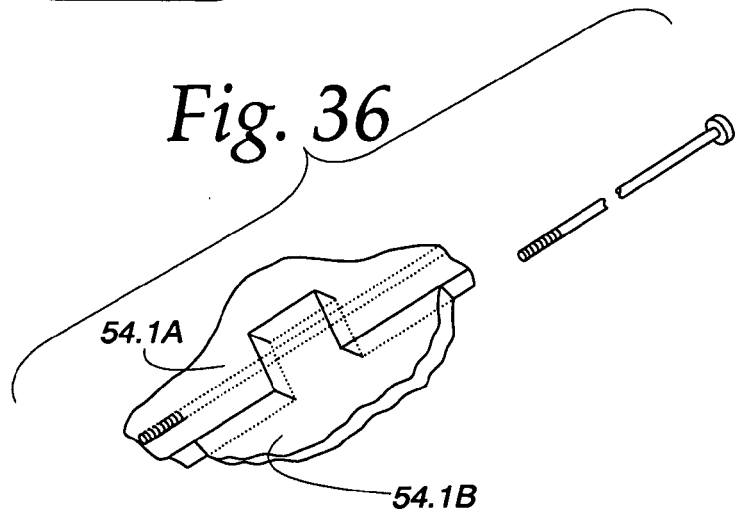
FIG. 36 is an enlarged, fragmentary perspective, detail view illustrating the manner in which the connection illustrated in FIG. 35 is accomplished with radially extending nut and bolt assemblies.
Figure 34:
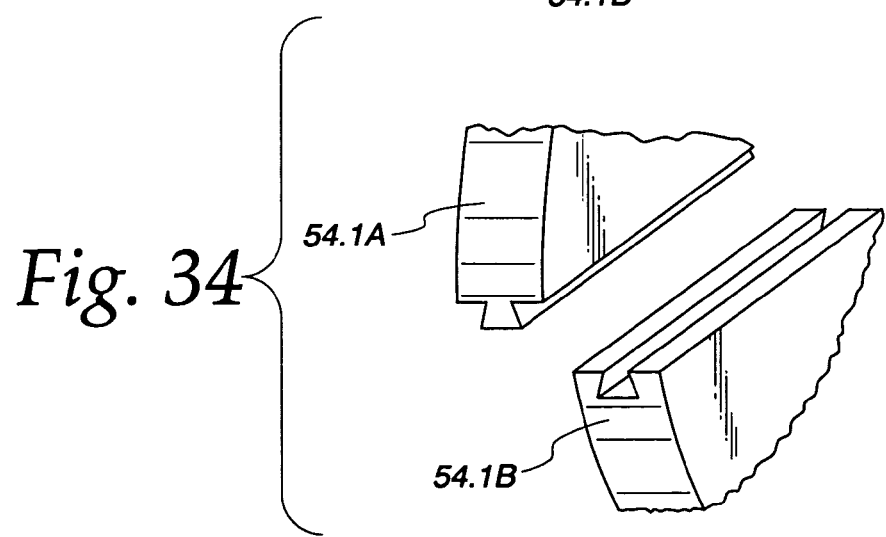
FIG. 34 is a fragmentary, perspective view illustrating a second manner in which diametrical edge portions of the end plates of a contactor drum such as shown in FIG. 31 may be associated together.

If desired, to aid in associating the half-disk like members 54.1A and 54.1B, the diametrically extending edge portions of a pair of the half-disk like members 54.1A and 54.1B can be modified to achieve a dowel butt joint arrangement such as illustrated in FIG. 33. Alternatively, such edge portions can be provided with a tongue and groove arrangement such as illustrated in FIG. 34. Alternatively, such edge portions can be provided with a bolted lap joint arrangement such as illustrated in FIGS. 35 and 36.

In a fully assembled contactor drum member 53 that includes at least one end plate 54 or 54.1, during rotation of the contactor drum member 53 on a rotating shaft assembly 76, wastewater which is present in a stage of the assembled and operating RBC can flow progressively into and transversely through the drum member 53 (relative to the longitudinal direction of an RBC trough), with the wastewater flowing through the chord-like passageways 57 defined by the corrugated sheets 56 from one circumferential side portion of the contactor drum member 53 to another, as those skilled in the art will readily appreciate.

Although various techniques can be used, the manner or technique by which a set or group of corrugated sheets comprising a core 55 is associated with an end plate 54 is believed to influence the durability of the resulting contactor 53 relative to a shaft assembly 76 with which a contactor drum 53 is associated.

Figure 28:
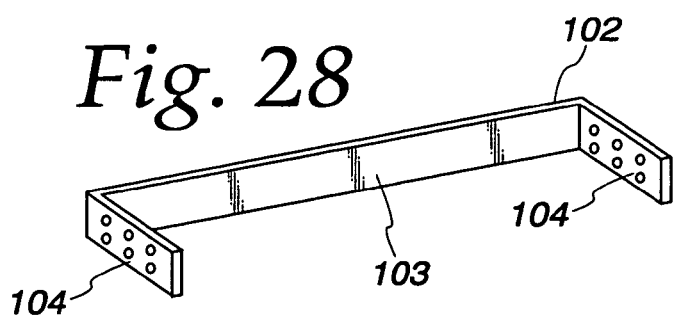
FIG. 28 is a perspective view of the bracket type employed in the assembly of rotating biological contactor embodiments such as shown in FIGS. 1 and 2.

In assembling a contactor 53 comprised of two component halves around a portion of the cross-sectionally square mid-region 77 of a shaft assembly 76, it is presently preferred to employ a plurality of elongated flat retainer bracket 102, of the type shown in FIG. 28, for example, that each extends over and across a circumferential edge portion of a contactor drum 53. Each bracket 102 has opposite end flanges 104 that are each fastened by screws or nut and bolt assemblies to a different side plate 54 or the like.

A plurality of retainer brackets 102, four, or more preferably six, per contactor drum member 53, are located at circumferentially equally spaced inset intervals about each contactor drum member 53 and each bracket 102 extends across a member 53 longitudinally (relative to an RBC embodiment). Each of the retainer brackets 102 has an elongated flattened body 103 with a terminal perpendicularly extending flange 104 defined at each opposite end thereof (relative to the body 103 of the retainer bar 102).

In a preferred assembly technique, a bracket 102 is turned 90° from its spatial orientation shown in FIGS. 1 and 2 so that it has the orientation illustrated in, for example, FIGS. 29, 30, 32, 31, 43, and 44.

Preferably, at least some of the brackets 102 used in a contactor drum member 53 are positioned so as to be generally radially aligned with a flat surface portion of the associated shaft mid-region 77. A bracket 102 can be positioned so as to have a flat side surface adjacent to a drum member 53 circumference, as illustrated, for example, in FIGS. 1 and 2, or, more preferably, can be positioned so as to have an edge region thereof generally radially oriented and extended into the drum member 53 as illustrated in FIGS. 30, 32, 43, and 44, for example. To accommodate each retainer bracket 102 in a drum member 53, preferably (as shown) portions of the corrugated sheet members 56 at the member 53 circumference adjacent to each retainer bracket 102 are cut away (or otherwise removed) so that each bracket 102 is recessed in the circumferential surface of the member 53 and the exterior circumferential surface portions of the resulting contact member 53 remain uniformly generally circular.

In an RBC embodiment such as 25 or 29, for example, where a paddle wheel 60 is adjacent to a drum contactor member 53, the relationship between each of the retainer brackets 102, a plate such as 54, a contactor 53 core, and each side plate 61 and 62 of the paddle wheel 60, is preferably such that one flange 104 of a retainer bracket 102 can be connected to plate 54 (preferably against an inside surface thereof) while the other flange 104 of the same bracket 102 can be connected to one plate 61 (preferably against an outside surface thereof) of a paddle wheel 61 with the body 103 extended over a circumferential portion of the contactor drum member 53 (see FIG. 43, for example). Preferred fastening means comprise nut and bolt assemblies (not shown) or the like. Thus, as further detailed below, the need or desirability for two side plates 54 can be avoided.

(E) Paddle Wheel Assemblies and Subcomponents

As shown in, for example, FIGS. 1, 2, 7, and 8, a paddle wheel assembly 60 includes a pair of longitudinally (relative to an RBC embodiment) spaced, parallel, circular, coaxial side plates 61 and 62 comprised of a thermoset resin, such as glass fiber filled polyester, for example, or a thermoplastic resin, such as thermoformable polyvinylchloride, for example. Other plastics and metals can be utilized, if desired. Preferably a paddle wheel has a cross sectionally square, axially extending aperture 73 defined through the center thereof.

Extending longitudinally between the side plates 61 and 62 are a plurality of generally radially oriented, elongated, circumferentially preferably equally spaced paddle blade members 64 that may be comprised of glass fiber filled polyester, metal, or the like as may be desired. The number of paddle blade members 64 in a paddle wheel assembly 60 can vary, but a present preference is for the number of paddle blade members 64 in a given paddle wheel assembly 60 ranges from about 8 to about 36 with 15 being presently most preferred; however, a fewer or a greater number of paddle blades 64 can be employed, if desired. Here, each of the respective opposite sides of each of the paddle blades 64 extend in spaced, parallel relationship relative to each other in the paddle wheel assembly 60. Each side is provided with a flange 67 that is perpendicularly oriented relative to adjacent blade portions. Each flange 67 is adapted to rest against portions of the adjacent plate 61 or 62 and in effect close the side portions of each blade 64 relative to the side plates 61 and 62.

As shown, for example, in FIGS. 7 and 8, in paddle wheel 60, each paddle blade member 64 has a generally longitudinally (relative to an RBC embodiment) flattened, radially elongated, straight extending mid-region 66 that longitudinally extends perpendicularly between the side plates 61 and 62. The inner terminal end region of each paddle blade member 64 defines an angularly and radially projecting tongue flange 68. The outer, terminal end region 69 ends adjacent to the perimeter of each plate 61 and 62 and adjacent thereto each paddle blade member 64 is curved and defines a cup-like region 71 that longitudinally extends between adjacent portions of the plates 61 and 62.

To connect a flange 67 with adjacent portions of the side plates 61 and 62, nut and bolt assemblies (not detailed) or the like can be used. The tongue flange 68 of each paddle blade member 64 is mounted to the tongue flange 68 of an adjacent paddle wheel member 64 by means of a nut and bolt assembly 74 or the like. Thus, as assembled, the tongue flanges 68 combine to define a type of hub 63 that is radially outwardly spaced relative to the shaft aperture 73 in each side plate 61 and 62. Sealing means, not shown, may be used between adjacent component portions to avoid water passage during use of the paddle wheel assembly 60.

In a paddle wheel assembly 60, all of the terminally curved cup-like portions 71 of each blade 64 have a similar curvature (see, for example, FIG. 8) and the direction and orientation of the curvature of each blade member 64 is similar. The effect of the curvature is to increase the fluid volume capacity of an individual blade 64 when, during rotation of the paddle wheel assembly 60, a blade 64 reaches or exits the surface of an aqueous medium in an RBC state. Characteristically, a blade 64 displaces a portion of an aqueous medium as it enters the medium when operating in a stage of an RBC or the like and lifts a portion of the aqueous medium (due to a localized vacuum effect) as it exits from the aqueous medium. With a paddle wheel assembly 60, both displacement and lifting of water occur during paddle wheel 60 rotation. Using an odd number of blades 64 in a paddle wheel 60, such as 15, reduces the effect of water impact and provides for a smoother operating process.

When an axially and rotatably mounted paddle wheel 60 has a fluidic (which can be a liquid like water or a compressed gas such as air) force applied particularly to surface portions of the paddle blade members 64, the paddle wheel 60 reacts and rotates responsively, as those skilled in the art will readily appreciate. Various equipment configurations can be employed to apply a fluidic force to the blades 64 of a paddle wheel 60.

Figure 39:
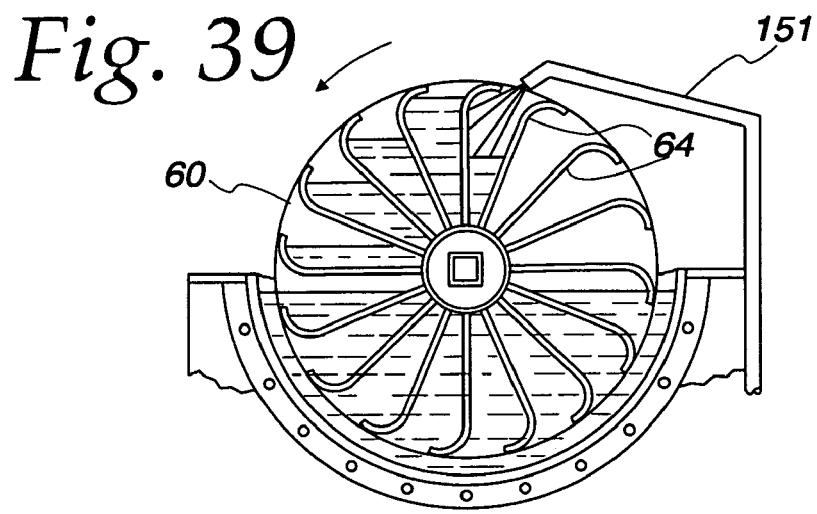
FIG. 39 is a diagrammatic vertical sectional view through a paddle wheel in an operating RBC embodiment illustrating one technique for applying a fluidic force to surface portions of the paddle wheel's blade members.

For example, as illustrated in FIG. 39, a stream of preferably pressurized water exiting from the mouth or nozzle of pipe 151 that terminates over the level of aqueous medium in an operating RBC stage is provided whereby the water so released from the pipe is directed to impact against the paddle wheel blade members 64 of a paddle wheel 60, thereby to cause the paddle wheel 60 to rotate or continue to rotate. The water thus provided can be from any convenient source including the wastewater itself that is being processed in an RBC embodiment.

Figure 40:
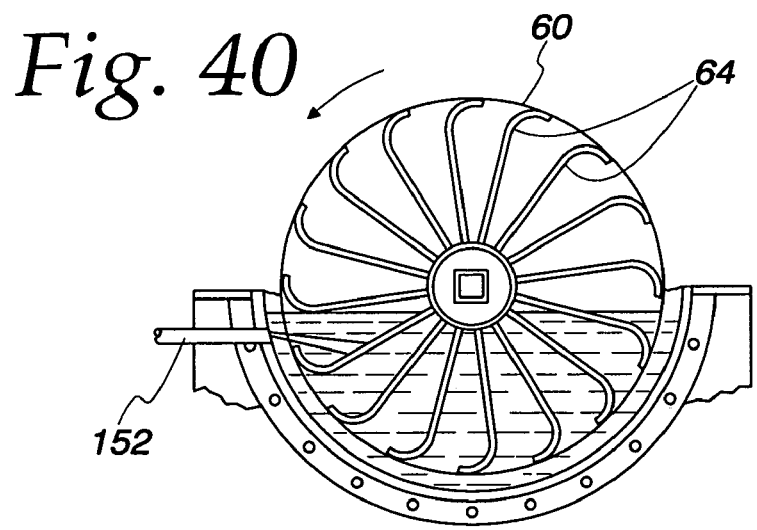
FIG. 40 is a diagrammatic view similar to FIG. 39 but illustrating a second technique for applying a fluidic force to surface portions of the paddle wheel's blade members.

For another example, as illustrated in FIG. 40, a pressurized stream of water (relative to the aqueous medium present in a stage) is released from the mouth or nozzle of a pipe 152 that terminates under the aqueous medium level in an operating RBC stage and is directed so as to impact against the paddle wheel blade members 64 of a paddle wheel 60, thereby to cause the paddle wheel 60 to rotate or continue to rotate. The water thus provided can be from any convenient source including the wastewater itself that is being processed in an RBC embodiment.

Figure 40A:
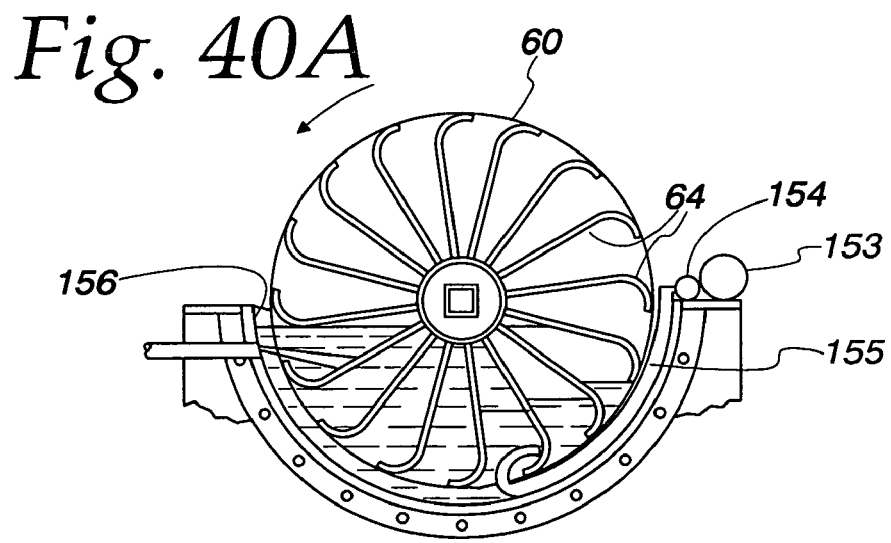
FIG. 40A is a diagrammatic view similar to FIG. 39 but illustrating a third technique for applying a fluidic force to surface portions of the paddle wheel's blade members.

For another example, as illustrated in FIG. 40A, a stream of a compressed gas, conveniently air, is conveyed through a manifold 153 and released through a ball valve 154 or the like into a delivery pipe 155 that, following circumferentially the internal contour of the adjacent trough 156, releases the air adjacent the bottom of the trough 156 so as to impact against the paddle wheel blade members 64 of a paddle wheel 60, thereby to cause the paddle wheel 60 to rotate or continue to rotate.

The amount and/or pressure of fluid so released against paddle blades can be regulated either manually or automatically. Preferably, in addition to the applied fluidic pressure, a paddle wheel 60 and the applied fluid are so arranged that the paddle blades 64 are induced to rotate by the weight of the fluid accumulating between circumferentially adjacent paddle blades 64. Typically, the amount and/or pressure achieved is sufficient to produce a desired rotation rate of the shaft assembly 76 with which the paddle wheel 76 is associated. Various operating options are available. As indicated herein, the shaft assembly 76 in a given stage of an RBC embodiment, for example, can be, as desired, (a) independently powered (rotatably driven) by the associated paddle wheel 60, (b) independently powered by the paddle wheel 60 in combination with an electric motor, (c) independently powered by an electric motor (not detailed) with the paddle wheel 60 undriven (not powered), (d) powered by the associated paddle wheel 60 in combination with other coaxially associated shaft assemblies 76 that are interconnected together in an RBC embodiment and that are themselves powered, or otherwise as may be desired.

A paddle wheel assembly can be variously constructed and assembled. An alternative embodiment 107 of a paddle wheel subassembly is illustrated, for example, in FIG. 9. Components of paddle wheel embodiment 107 that are similar to those of paddle wheel embodiment 60 are similarly numbered but with the addition of prime marks added thereto for convenient identification purposes. In the paddle wheel 107, the paddle wheel blade members 64' each extend radially and in a straight configuration. A flange 108 at the inner end of each blade member 64' is mounted by nut and bolt assemblies to a separate preformed hub member 106 that is located in radially outwardly spaced relationship to aperture 73' in side plate 62'. FIG. 10 illustrates the central structure of the paddle wheel assembly 107.

FIG. 37 illustrates an embodiment of a paddle wheel assembly 114 which is similar to paddle wheel assembly 107 except that the paddle wheel 114 has 15 paddle blade members 64' each with a outer terminal curvature similar to that in blades 64.

FIG. 38 illustrates fragmentarily an embodiment of a paddle wheel assembly wherein each paddle wheel blade member 64' at its inner end is provided with a flange 108' that is adapted to engage a slot 138 defined in a preformed hub member 139.

Figure 41:
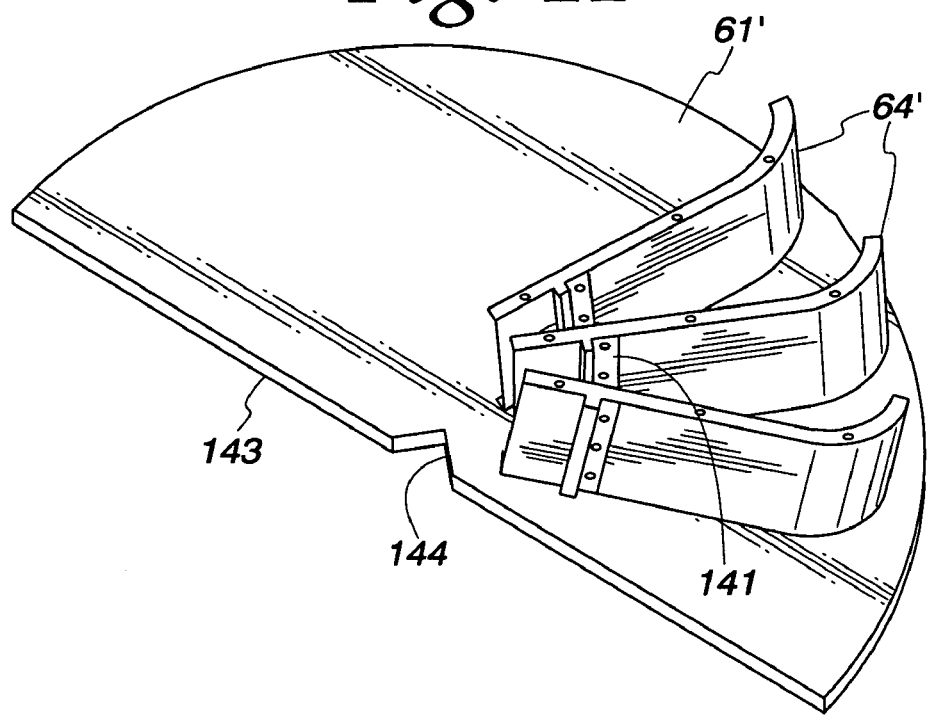
FIG. 41 is a fragmentary perspective view illustrating construction of an alternative embodiment of a paddle wheel assembly.
Figure 42:
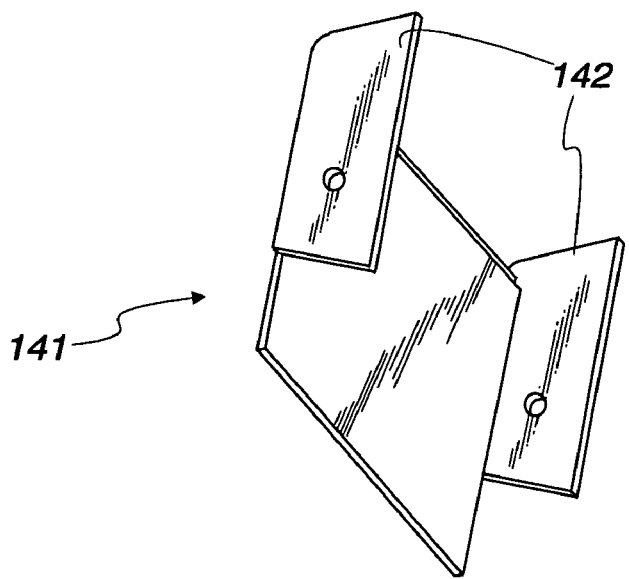
FIG. 42 is a perspective view of the paddle blade spacing and supporting member utilized in the paddle wheel of FIG. 41.

FIGS. 41 and 42 illustrate fragmentarily an embodiment of a paddle wheel assembly which can be comprised of thermoformed polyvinyl chloride sheeting, if desired. Each side plate 61' and 62' (the latter not detailed) is defined by halves which each have a flange 143 defined along their respective diameters except for a shaft receiving notch defined medially. These halves abuttingly engage the halves about a square shaft, such as mid-portion 77, and are mounted together by screws, nuts and bolts, rivets or the like (not detailed). The individual paddle blade members 64' can have a configuration similar to the blade members 64 and can similarly be mounted to the side plates 61' and 62'. To provide a desired spacing between circumferentially adjacent blade members 64', enhance blade structure, and aid in mounting, a positioning and rigidifying bracket 141 is inserted between adjacent members 64' with a receiving pocket being provided in each blade structure 64' that is adapted to receive what can be regarded as the leading edge of a bracket 141. Each bracket 141 is provided with a pair of opposed side flanges 142 that extend at about 90 degrees relative to the flat body of the bracket 141. The flanges 141 have holes defined therein to enable mounting to an adjacent side plate 61' or the like. The bracket 141 also limits water passage between adjacent blade members 64'.

(F) Shaft Assemblies, Bearing Assemblies and Support Assemblies

Various shaft, bearing, and bearing support arrangements can be used in assembling an RBC embodiment using components and subcomponents provided by this invention, as those skilled in the art will readily appreciate. Presently preferred is a shaft assembly 76 (see FIG. 2, for example) which includes medially a cross-sectionally square and preferably hollow mid-portion 77 plus a cross-sectionally round and preferably solid cylindrical portion 78, 79 at each end opposite end region thereof.

A single shaft assembly 76 can be connected to longitudinally adjacent, coaxial other shaft assemblies that are each comprised of a mid portion 77 plus a cylindrical opposite end portions 78 and 79 to achieve a plurality of coaxial shaft assemblies 76 that in one preferred form rotate together. A present preference is to have each opposite end portion 78 and 79 comprised of steel and to have each mid portion 77 comprised of steel or more preferably pultruded glass fiber filled polyester although other constructions can be employed.

For portion 77 connection with portions 78 and 79, into the open end of each opposite end of the mid-portion 77 a plug 81 is preferably inserted and held in place by means of an adhesive, welding, or the like. The rearward (inward) end of each shaft end portion 78, 79 is preferably fixedly connected by welding or the like with an enlarged transversely extending mounting plate 82 that preferably has a square perimeter. The relationship between the cross-sectional diameter of each respective end of the shaft end portions 78,79 and the perimeter dimensions of the mounting plate 82 are such that, with the rearward end of each of the shaft end portions 78, 79 mounted to a different one of the mounting plates 82, the axis of each shaft end portion 78, 79 is coaxially alignable with the axis of the mid-portion 77. The rearward end of each shaft end portion 78, 79 is preferably located adjacent each opposite end of the mid-portion 77 with a plate 82 therebetween. A plurality (preferably four, as shown) mounting screws 83 or the like conveniently pass through each of the plates 82 and threadably engage adjacent portions of each plug 81, thereby mounting each shaft end portion 78, 79 to a different opposite end of the mid-portion 77. As so assembled, a resulting shaft assembly 76 has a length that extends longitudinally and axially (relative to the trough sections employed) between, for example, a longitudinally adjacent pair of the bulkheads 39 at each opposite end of a stage 26, 27, or 28 of RBC embodiment 25 or of the stage of the RBC embodiment 29.

To support each shaft end portion 78, 79 and an associated bearing block assembly 84 (described below) or the like, a shelf structure 47 (above described) is associated with each bulkhead 39. Each shelf structure 47 is associated with and supports a different bearing block subassembly 84, and each shaft end portion 78, 79 of each shaft section 76 is associated with a different bearing block subassembly 84. When the end portions 78, 79 of two different shaft sections 76 are each so associated with a bearing block assembly 84, the axis of shaft end portions 78 and 79 are adapted to be substantially coaxial with the axis of the hemi cylindrical tank or trough chamber defined, for example, by the associated combination of the interior side walls 33 of the longitudinally aligned tank sections 30, 31, 32 defining the stages 26, 27, and 28 of embodiment 25, or defined by the associated combination of the interior side walls 33 of the longitudinally aligned sections 30, 32 of the single stage of embodiment 29.

For association with a bearing assembly 84 or the like, each shaft end portion 78 and 79 preferably has a remote outer end region 87 (see FIG. 4) defined therein that is provided with a reduced diameter relative to the diameter of the main adjacent body of each shaft end portion 78, 79, and each such remote outer end region 87 is provided with a longitudinally extending key-way slot. In a bearing assembly 84, over each remote outer end region 87, a split collar 86 is mounted. Thus, one collar half 86b is adapted to mount over one half of the remote outer end region 87 of each shaft end portion 78 and 79 and has defined therein a longitudinally extending key slot. The respective key slots in each of the collar half 86b and end region 87 are adapted to cooperatively receive a key 88 (one key 88 for each shaft end portion 78, 79), thereby preventing collar half 86b from being rotatable relative to each end region 87. The other collar half 86a is adapted to mount over the remaining half of the remote outer end region 87 of each shaft end portion 78 and 79. Screws 89 extend off-diameter through the collar halves 86a and 86b to engage them together about each end region 87, thereby engaging the respective shaft end portions 78 and 79.

Screws 99 extend longitudinally but off-diameter through the collar halves 86a and 86b to engage them together with the shaft end portions 78,79 adjacent, connected and extending coaxially. When an RBC embodiment incorporates a paddle wheel, or particularly when an RBC embodiment incorporates a plurality of longitudinally adjacent stages, and one stage is to have its shaft assembly 76 operate independently from an adjacent stage, the bearing block subassembly 84 can be employed between such a longitudinally adjacent pair of shaft assemblies 76. These shaft assemblies 76 can be independently operated relative to each other by simply removing the screws 99.

When, for example, a pair of longitudinally adjacent shaft assemblies 76 are to be coaxially interconnected together through a bearing block subassembly 84, the end portion 78 of one shaft section 76, and the end portion 79 of a second shaft section 76, each with an associated split collar 86, are associated with a bearing block assembly 84, and in the bearing block assembly 84 the axis of each shaft assembly 76 is positioned coaxially relatively to the other. Preferably a similar bearing block subassembly 84 is associated with each shelf member 47 in an RBC embodiment. Those skilled in the art, will readily appreciate that, if desired, alternative other bearing block assemblies and supports can be utilized, if desired.

Figure 4:
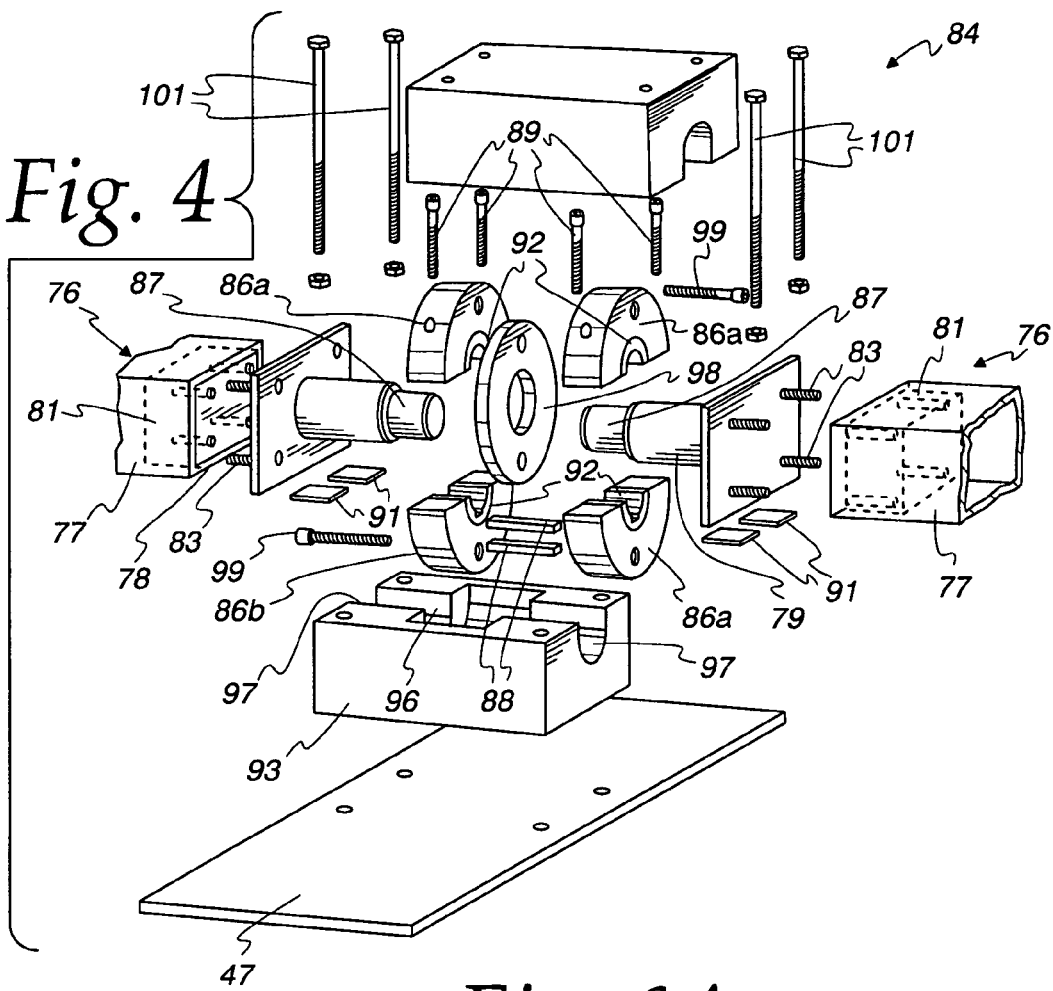
FIG. 4 is an exploded perspective view of the bearing block assembly of the rotating biological contactor embodiment shown in FIG. 1 and FIG. 3 which interconnects coaxially with respective adjacent end of each of a the pair of coaxial shafts employed in the first and the second stages of the rotating biological contactor embodiment shown in FIG. 1, the shafts being broken away adjacent to each of their respective shaft ends.

Referring to FIGS. 3 and 4, the bearing block subassembly 84 includes a base block 93 and an associatively engageable cap block 94. Each block 93 and 94 has defined centrally therein a hemicylindrical collar-receiving cavity 96 in a mid-region thereof. The cavity 96 at each of its opposed opposite ends interconnects with a hemi-cylindrical shaft-accommodating cavity 97 (paired). The configuration of blocks 93 and 94 and of the cavities 96 and 97 are such that, when the cap block 94 is associated over the base block 93, the cavities 96 and 97 are matingly arranged so that each of the two combined hemi-cylindrical shaft accommodating cavities 97/97 and the combined hemi cylindrical collar receiving cavities 96/96 are coaxial with one another with the shaft accommodating cavities 97/97 being located in longitudinally spaced relationship relative to each other, one cavity 97/97 being at each end of the collar-receiving cavity 96/96.

As positioned in a bearing block subassembly 84, a spacer pad 98 (see FIG. 4) is preferably located between adjacent split collars 86. Collar connecting screws 99 (preferably two, each preferably about 180 degrees apart from the other) are longitudinally extended through and connected with the adjacent split collars, thereby interconnecting the shaft section 76 of end portion 78 with the shaft section 76 of end portion 79 in the bearing block subassembly 84. Preferably, each screw 99 extends in an opposite direction relative to the other. The cap block 94 is associated with the base block 93 and also with the shelf member 47 by a plurality (preferably four) of nut and bolt assemblies 101. Thus, as so joined by means of a bearing block assembly 84, two or more shaft assemblies 76 can be coaxially connected together to comprise a multi-component shaft subassembly for use in fabricating or operating an RBC embodiment.

Sometimes there is a need to adjust the length of the mid-portion 77 of an embodiment of the shaft assembly 76.

A starting mid-portion 77 is easily shortened by cutting a long mid-portion 77 to achieve a desired length. One manner of easily lengthening a starting mid-portion 77 is to add or extend one end thereof a desired length with an extending mid-section 77A. Such a lengthening is conveniently achieved as illustrated in FIG. 16. Thus, into an open end of a too short mid-section 77 is slidably extended one end of a cross-sectionally square, elongated connector block 123 (comprised of metal or plastic) whose body dimensions are selected to permit the block 123 to fit slidably into that end. A raised shoulder band 124 (comprised of metal or plastic) of narrow width is associated with and extends around the exterior mid-region of the block 123. The band 124 provides a stop that limits the extent to which the block 123 can extend into a length of a mid section 77. The opposite end of the block 123 is extended into the open end of another mid-portion 77A whose length when added to that of mid-portion 77 equals a desired length for a mid-portion comprised of mid-portion 77 plus mid-portion 77A after adjacent respective ends of section 77 and 77A are each fully engaged with block 123. The block 123 can be bonded by adhesive (not shown) to the associated section 77 or 77A, and/or the block 123 can be secured to a section 77 or 77A by means of a headless nut and bolt assembly (not shown) which extends preferably perpendicularly through aligned holes transversely extending through a block 123 and a mid-portion 77 or 77A, the alignable hole in each being arranged to be in spaced, adjacent relationship to a nearly end thereof.

Another manner in which a mid-portion 77 can be lengthened by an extension portion 77A is illustrated in FIG. 18. Here, two lengths that when added together equal a desired length for a total mid portion 77 are held in adjacent coaxial relationship by an overfitting clamp 130 comprised to two terminally flanged C-type halves 130A and 130B that are engageable with one another by nut and bolt assemblies 131.

A contactor drum assembly or a paddle wheel assembly such as provided by the invention can each be associated at a desired longitudinal location along a mid-portion 77 on a shaft assembly 76 by various means. One suitable means is illustrated in FIG. 19 where a mid-portion 77 is provided with ridges 132 (conveniently comprised of metal or plastic) that extend circumferentially around the square mid-portion 77, the ridges 132 being bonded to the mid-portion 77. The location of the ridges 132 is such that, after a contactor drum assembly or paddle wheel assembly is assembled around the mid-portion 77, the ridges 132 are engaged therewith and serve to retain selected edge portions of a contactor drum or a paddle wheel assembly end walls at their respective desired centers.

Alternatively, the end plates 82 of a suitably arranged shaft assembly 76 can be placed adjacent to a contactor drum or paddle wheel assembly in an RBC embodiment thereby to hold a contactor drum, a paddle wheel assembly, or a combination of contactor drum(s) and paddle wheel assembly in association with the mid portion 77.

Various motor interconnection and power transfer arrangements can be employed in an RBC embodiment. One manner in which a shaft assembly 76 may be connected to a motor drive is illustrated in FIGS. 11 and 17. A spur shaft 117 is coaxially extended from an end portion 78 that is rotatably supported by bearing block assembly 84 as above explained. The spur shaft 117 is keyed to a relatively large driven sprocket 118 that is generally coplanar with a relatively small drive sprocket 120 that is associated therewith by a chain drive 119. The drive sprocket 120 is fixed to the drive shaft of a conventional geared motor drive assembly 121 located exteriorly but adjacent to an RBC embodiment.

(G) Combinations of Shaft Assemblies with Contactor Drum and Paddle Wheel Assemblies An important feature of the present invention is that embodiments of the inventive contactor drums and paddle wheel assemblies can be combined to achieve various novel and improved combinations over and about shaft assemblies.

In the illustrative but presently preferred combination shown in FIG. 1, in a single stage, such as stage 26, a paddle wheel assembly 60 is located between two contactor drum assemblies 53. Each contactor drum assembly 53 is oriented spatially so that an outermost corrugated sheet member 56 is adjacent to a different one of the side plates 61 and 62 of the paddle wheel assembly 60. Thus, only one side plate 54 located on the outer side of each contactor drum assembly 53 is needed. Each of the retainer brackets 102 extends at the circumference over and against the core of each drum assembly 53 with the each bracket 102 opposite end mounted to a different end plate 54 and 61 and also plate 54 and 62. Each bracket 102 also serves to associate each contactor drum 53 with the paddle wheel assembly 60. Preferably and as shown, each shaft assembly 76 has a mid-portion 77 that is about equal to the combined thickness of the paddle wheel assembly 60 and the two contactor drum assemblies 53. Thus, each of the mounting plates 82 is adjacent a different one of the side plates 54 of the contractor drum assemblies 53 and serves to retain the drum assemblies 53 and the paddle wheel assembly 60 associated with the mid-portion 77.

FIG. 43 illustrates another embodiment of a type similar to that shown in FIG. 1 where the contactor drums 53 and the paddle wheel 60 are similarly assembled together as in FIG. 1 from subcomponents for each using a shaft assembly as shown FIG. 19. FIG. 1 and FIG. 2 do not indicate subcomponent possibilities for the contactor drums 53 or the paddle wheel 60 for reasons of simplicity. In FIG. 43, the contactor halves are identified as 53A and 53B, illustrative brackets 102 are radially oriented, and the paddle wheel halves are identified as 60A and 60B. To enhance structural integrity, each outside plate 54o of each contactor drum 53A/53B can, if desired, be optionally provided with a second two component plate 54p, and each such second plate 54B has its halves and associated respective diameters turned 90° relative to the corresponding respective positions in plate 54o. The shaft assembly 76 is provided with both mounting plates 82 and ridges 132 for use in positioning the contactor drums 53A/53B and the paddle wheel 60A/60B on the mid portion 77.

Figure 44:
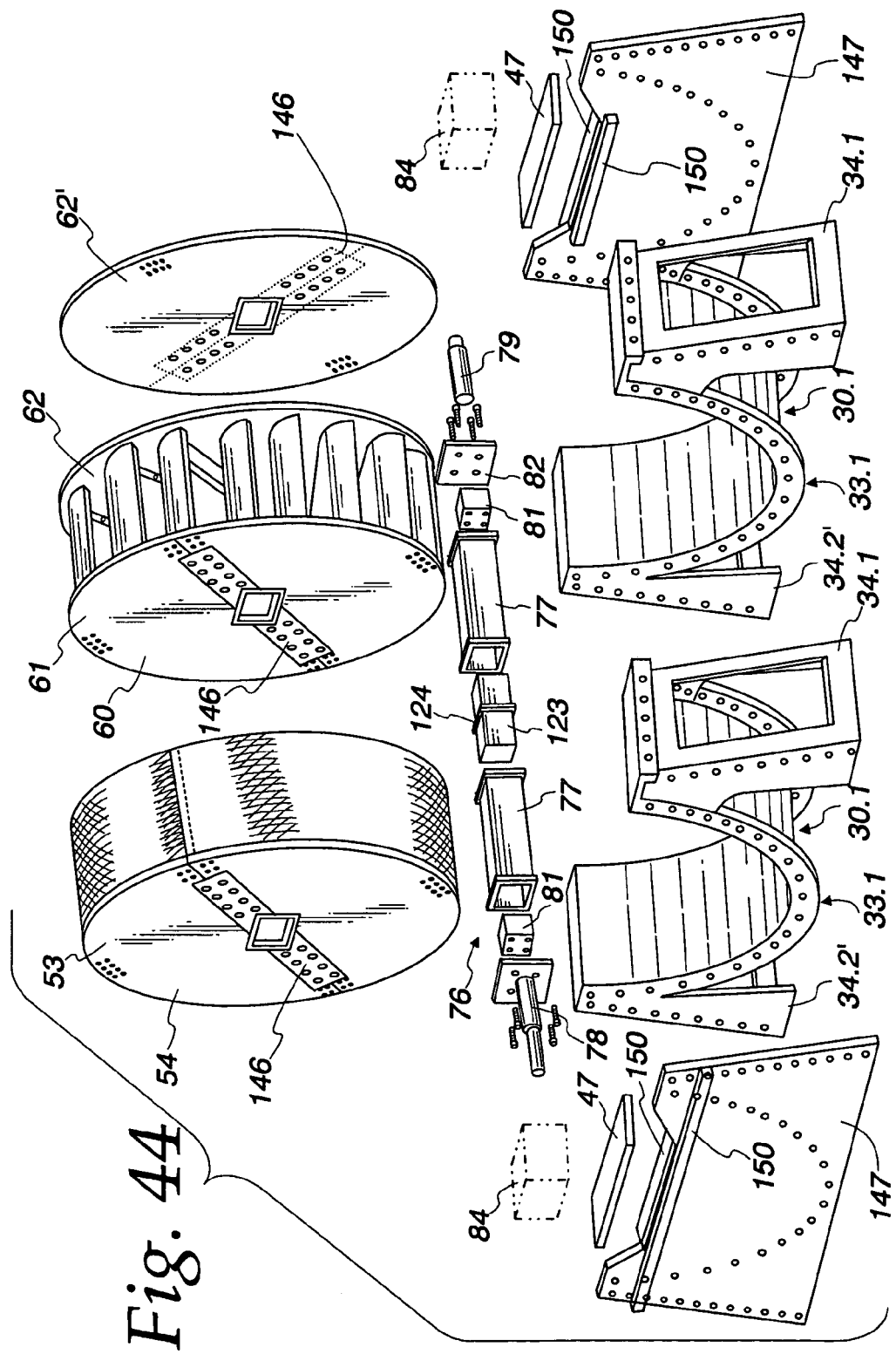
FIG. 44 is an exploded perspective view of an RBC embodiment that incorporates a combination of a contactor drum and a paddle wheel with a shaft assembly, each component being assembled from subassemblies, the bearing assembly being shown in phantom, this combination being comparable in part to the RBC embodiment shown in FIG. 2.

FIG. 44 illustrates an embodiment of the type similar to that shown in FIG. 2 where the contactor drum 53 and the paddle wheel 60 are assembled from subcomponents for each using a shaft assembly as shown in FIG. 16 and trough sections are assembled from components as shown in FIG. 25. An additional but optional two-piece side plate 62' is provided to reinforce the side plate 62 of the two piece paddle wheel 60, the side plate 62' being rotated 90° relative to the side plate 62. Here, each two piece plate 54, 61, 62 and 62' is being assembled with a connecting plate 146. A stabilizing side plate 62' that is adjacent to plate 62 is turned 90° relative to the side plate 62 to provide better structural integrity for the paddle wheel 60.

Figure 45:
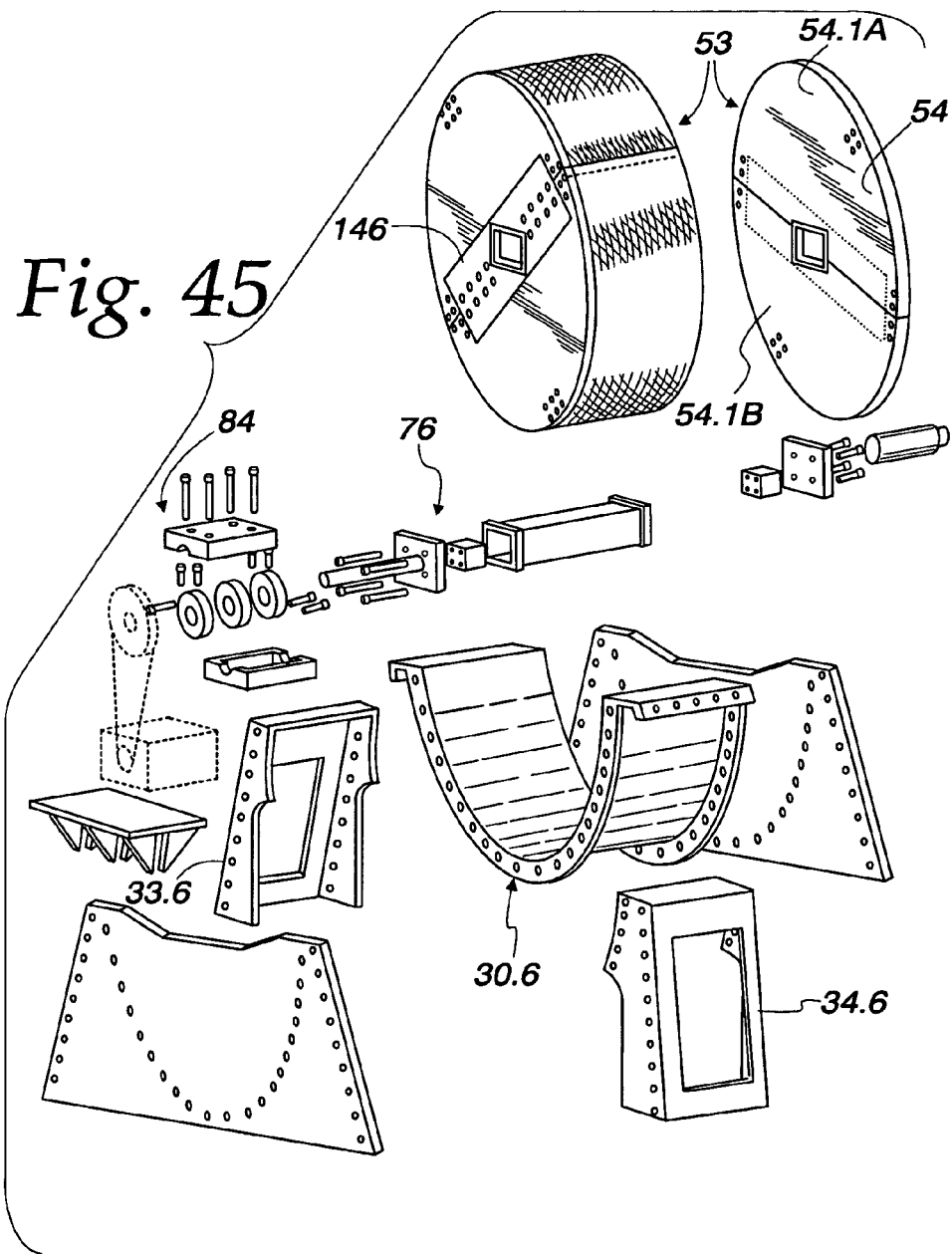
FIG. 45 is an exploded perspective view of an RBC embodiment which incorporates one trough defining section of the type shown in FIG. 27, one contactor drum assembly of the type shown in FIG. 31, one shaft assembly of the type shown in FIG. 19, and a pair of bullheads of the type shown in FIG. 24.

FIG. 45 illustrates an RBC stage embodiment incorporating a single contactor member 53, this embodiment being assembled from the contactor drum components of FIG. 31, a shaft assembly of the type shown in FIGS. 19 and 43, a trough defining structure of the type shown in FIG. 27, and bulkheads of the type shown in FIG. 24, for example.

FIGS. 43–45 illustrate assemblies of various component combinations that can be employed an RBC embodiment of the invention using the inventive subcomponents and components. Other assemblies will be apparent to those skilled in the art.

As those skilled in the art will readily appreciate, use situations may occur where a single stage can be utilized which comprises a single tank section 30 that is associated with a bulkhead 39 at each opposite end thereof. That stage can be provided with a shaft section or assembly 76 which has a mid-region 77 and end regions 78 and 79 that are adapted for usage in such stage, and each bulkhead 39 is provided with a shelf member 47 and set of supports 46 and with a bearing support assembly 84. That stage can be associated with a single contactor member 53, a single paddle wheel assembly 60, or otherwise as may be desired.

As those skilled in the art will also readily appreciate, a single stage can be comprised of a plurality of longitudinally interconnected sections 30 with a bulkhead 39 associated at each opposite end thereof. Although the mid-portion 77 of a shaft section 76 can be substantially lengthened so as to adapt a shaft section 76 for usage in a stage having such a plurality of interconnected sections 30, it is presently preferred that a stage not incorporate more than about 4 such interconnected sections 30 and that a single group of interconnected shaft assemblies 76 be not longer that about eight feet.

In the practice of the present invention, preferably at least two similar tank housing sections (each unitarily formed or comprised of multicomponents such as described herein) are directly or indirectly (perhaps through a bulkhead) interconnected together. Each tank section has both inside wall portions that define a generally hemi cylindrical trough region that extends longitudinally therethrough, and outside wall portions that define section support means extending downwardly from upper opposite side regions of said inside wall portions for abutting engagement with a support surface. The tank housing sections each have generally similar inside and outside dimensions, respective end wall portions that are abuttingly engageable with one another. The tank housing sections are so oriented relative to one another that, when the end wall portions are so abuttingly engaged, a hemi cylindrical trough region is defined by the so engaged sections and such trough defines a common longitudinal axis relative to the hemicylindrical trough region. Mounting and sealing means is provided for engaging adjacent pairs of the tank housing sections together in a generally fluid tight engagement.

For operation, an RBC embodiment, such as embodiment 25 or embodiment 29, can be associated with conventional auxiliary equipment, as those skilled in the art will readily appreciate. For example, as illustrated in FIG. 11, wastewater (not detailed) can be preliminarily charged to a pretreating device, such as a settling tank 115 or the like, if desired, for preliminary removal of particulate solids by settling, filtering, or the like. From settling tank 115, wastewater is transported through a conduit 116 to the first stage 26 of an RBC 25, or the like, as desired. Into stage 26 the wastewater is discharged from conduit 116 against the paddlewheel assembly 60, inducing it to rotate and thereby revolve the shaft assembly 76. Additionally, a stub shaft 117 is connected to the end bearing block subassembly 84 and a power input sprocket 118 is connected with the projecting portion of shaft 117. Sprocket 118 is associated with a drive chain 119, and the drive chain 119 in turn is engaged with the drive sprocket 120 of a motor reducer drive assembly 121 (conventional). Thus, when the motor drive assembly 121 is electrically powered, the shaft assembly 76 and its mid-portion 77 are rotated and the drive assembly 121 augments the power produced by rotation of the paddle wheel assembly 60.

As is apparent from the foregoing specification and the appended drawings, the invention is susceptible to being embodied in various alternative and modified embodiments which may differ from the particular teachings here disclosed. It should be understood that I wish to embody within the scope of the present patent all such alternative and modified embodiments as reasonably and properly come with the scope of this contribution to the art.

What is claimed is:

1. A rotating biological contactor apparatus comprising in combination:
   (a) at least one trough defining section, each said trough defining section having a trough that extends longitudinally therethrough, that has transversely curved inside wall portions, and that has open opposed end portions, and each said trough defining section is unitarily formed and includes flange portions defined along said opposed end portions for joining to adjacent members, and, when more than one said trough defining section is present, then said trough defining sections each have a similar cross-sectional trough internal surface configuration, and said trough defining sections are engageable in end to end longitudinally adjacent relationship thereby to define a common subassembly wherein said troughs thereof are longitudinally aligned along a common longitudinal axis, and including joining means for joining together said flange portions of said longitudinally adjacent trough defining sections;
   (b) at least two bulkhead members, one said bulkhead member being disposable either across a different one of said opposed ends of said trough defining section or when said common subassembly is present being disposable across each opposite end of said common subassembly, and when said common subassembly is present then optionally one of said bulkhead members can be disposed adjacent to and between each longitudinally adjacent pair of said trough defining sections, and including means for engaging each said so disposed said bulkhead member with each adjacent said flange portion;
   (c) shaft means extending longitudinally through said trough(s) and including both bearing means for rotatably supporting said shaft means and support means for supporting said bearing means at each of said so engaged bulkhead members;
   (d) at least one contactor drum having an axial portion and a circumferentially extending peripheral portion, said axial portion being associated with said shaft means and adapted to rotate therewith in said trough(s), said contactor drum comprising a core portion and a plate portion along at least one side of said core portion, said core portion including a plurality of corrugated sheet members that cooperate to define a plurality of passageways that extend generally transversely through said core portion, said core portion and said plate portion being interconnected by a plurality of longitudinally extending, peripherally located, circumferentially spaced bracket members; and
   (e) power means for rotating said shaft means.

2. The apparatus of claim 1 wherein said contactor drum is generally cylindrically configured and has a plate portion along each opposed side thereof.

3. The apparatus of claim 1 wherein said (a), (b), (c) and (d) components are assemblable with one another and with said power means at an installation site, thereby to comprise an embodiment of said rotating biological contactor apparatus.

4. The apparatus of claim 1 wherein said (a), (b), (c), and (d) components are purchased as members of a kit that, when combined with said power means, comprises when assembled an embodiment of said rotating biological contactor apparatus.

5. The apparatus of claim 4 which is assembled into an embodiment of said rotating biological contactor apparatus.

6. The apparatus of claim 1 wherein each said trough defining section has a side wall supporting portion along a portion of each opposite lateral side portion thereof, and each said side wall supporting portion has a relatively large aperture defined therein.

7. The apparatus of claim 6 wherein, along one said lateral side portion of at least one said trough defining section, said side wall supporting portion is unitarily engaged with said trough defining portion.

8. The apparatus of claim 7 wherein one said side wall supporting portion is separate from but engageable with one of said opposite lateral side portions of at least one said trough defining section.

9. The apparatus of claim 1 which is initially disassembled but which is assembled into a rotating biological contactor at an installation site.

10. The apparatus of claim 1 which includes at least two of said trough defining sections and at least three of said bulkhead members, and wherein at least one said bulkhead member is positioned between a pair of longitudinally adjacent said trough defining sections so that said rotating biological contactor apparatus defines at least two stages along said trough defining portions.

11. The apparatus of claim 10 wherein at least one said trough defining section has opposing lateral side wall supporting portions that each have a relatively large aperture defined therein.

12. The apparatus of claim 10 wherein said shaft means in each said stage comprises a shaft assembly, and each said shaft assembly comprises a generally cross-sectionally square mid region section and a generally cylindrical shaft section associated with each opposite end of said mid region section.

13. The apparatus of claim 10 wherein, in each said stage, each said generally cylindrical shaft section is rotatably associated with and supported by a different said bearing means, and each said bearing means is associated with a different support means at each said bulkhead, and wherein each said shaft assembly extends generally coaxially relative to others thereof in adjacent said stages.

14. The apparatus of claim 13 wherein all said shaft assemblies are axially interconnected through said bearing means whereby all said shaft means revolve together.

15. The apparatus of claim 13 wherein each said shaft assembly rotates independently of others thereof.

16. The apparatus of claim 13 wherein said stage there is at least one said contactor drum, and each said contactor drum includes a plurality of interfacially arranged and interconnected corrugated sheet members wherein the corrugations are so positioned that water can flow transversely through each said contactor drum as said contactor drum revolves, and each said contactor drum is axially associated with a cross-sectionally square mid region section a shaft assembly.

17. The apparatus of claim 16 wherein said corrugated sheet members are each comprised of polyvinylchloride.

18. The apparatus of claim 16 wherein each said contactor drum on at least one side thereof is associated with a generally flat and circular side plate which is axially associated with said shaft means.

19. The apparatus of claim 1 which employs at least two said contactor drums and wherein each said contactor drum is axially associated with said shaft means and each said contactor drum includes a plurality of interfacially arranged and interconnected corrugated sheet members wherein the corrugations are so positioned that water can flow transversely through each said contactor drum as said contactor drum revolves.

20. The apparatus of claim 1 wherein said power means includes an electric motor means.

21. The apparatus of claim 1 wherein said power means includes at least one paddle wheel that is axially associated with said shaft means and that is located in a region of said trough; and each said paddle wheel includes paddle blades and means for directing a fluid stream against said paddle blades, thereby to rotate said paddle wheel.

22. The apparatus of claim 21 wherein said power means further includes an electric motor means.

23. The apparatus of claim 21
which includes at least two said trough defining sections and at least three said bulkhead members, and wherein at least one bulkhead is positioned between an adjacent pair of said trough defining sections so that said rotating biological contactor apparatus defines at least two stages along said trough defining sections,
where, in each said stage, said shaft means comprises a shaft assembly, and each said shaft assembly comprises a generally cross-sectionally square mid region section and a generally cylindrical shaft section associated with each opposite end of said mid region section, each said cylindrical shaft section is rotatably associated with and supported by said bearing means at each said bulkhead member, and said bearing means has said support means associated therewith for connecting and supporting said bearing means with each said bulkhead, and wherein each said shaft assembly extends generally coaxially relative to others thereof in adjacent said stages, and
wherein said paddle wheel is associated with said mid region section in at least one said stage.

24. The apparatus of claim 23 where, in at least one said stage, a contactor drum is associated with said mid-region section.

25. The apparatus of claim 23 where, in each said stage, said square mid region section is associated with (a) at least one said contactor drum, (b) one said paddle wheel, or (c) both at least one said contactor drum and one said paddle wheel.

26. The apparatus of claim 23 wherein each said paddle wheel comprises a pair of spaced, parallel side plates and a plurality of generally radially extending, circumferentially equally spaced paddle blade members located between and interconnected to said side plates.

27. The apparatus of claim 1 wherein each of said (a), (b), (c) and (d) components is comprised of prefabricated subcomponents that are assemblable with one another to comprise an embodiment of said rotating biological contactor.

28. The apparatus of claim 12 wherein said contactor drum is divided into two halves along a diameter thereof that extends diagonally through a square aperture from one corner to an opposite corner thereof, and which includes means for fastening said two halves together about and over the shaft section that is cross sectionally square and that matingly extends through said square aperture.

29. One stage for a rotating biological contactor comprising:
(a) a longitudinally extending trough defined by at least two interconnected longitudinally adjacent trough defining sections and having opposite end portions each defined by an attached bulkhead;
(b) a shaft assembly extending longitudinally through said trough, said shaft assembly comprising a cross-sectionally square mid section and a coaxial cylindrical section at each opposite end of said mid section, said shaft assembly including bearing means that rotatably supports each said cylindrical section and support means for each said bearing means supported by each said bulkhead;
(c) a combination of a paddle wheel with a contactor drum disposed for rotation on said square mid-section, including means for retaining said combination on said square mid-section, said paddle wheel comprising a plurality of generally radially extending, circumferentially equally spaced paddle blades supported between a pair of spaced, parallel side plates, and said contactor drum comprising a core portion comprising a plurality of interconnected corrugated sheet members wherein the channels defined by corrugations between adjacent sheet member generally extend in a chord-like pattern transversely across and through said core portion and an end plate associated with the outside surface of said core portion, and including means for longitudinally joining said contactor drum with paddle wheel on said square mid section.

30. The stage of claim 29 wherein one said contactor drum is located on each side of said paddle wheel, each side plate of said paddle wheel serves as a side plate also for said adjacent contactor drum, and a single side plate is provided on the outside of each contactor drum.

31. The stage of claim 29 wherein said means for joining includes retaining plate means at each opposite end portion said mid section.

32. The stage of claim 29 where, in said contactor drum, said corrugated sheet members are each being comprised of polyvinylchloride.

33. The stage of claim 29 wherein, in said contactor drum, said corrugated sheet members are comprised of glass filled polyester.

34. The stage of claim 29 wherein each said trough defining portion has lateral opposite side portions that support said trough defining portion.

35. The stage of claim 34 wherein at least one of said lateral side portions is detachably associated with said trough defining portion.

36. The stage of claim 34 wherein both said lateral opposite portions are detachably associated with said trough defining portion.

37. The stage of claim 29 wherein said paddle wheel is divided into two halves approximately along a diameter thereof that extends diagonally through a square aperture from one corner to an opposite corner thereof, and which includes means for fastening said two halves together with the cross sectionally square section of the shaft matingly extended through said square aperture.

38. The stage of claim 29, wherein said contactor drum is divided into two halves approximately along a diameter thereof that extends diagonally through a square aperture from one corner to an opposite corner thereof, and which includes means for fastening said two halves together with the cross sectionally square section of the shaft matingly extended through said square aperture.

39. A rotating biological contactor apparatus comprising in combination:
(a) at least one trough defining section, each said trough defining section having a trough that extends longitudinally therethrough, that has transversely curved inside wall portions, and that has open opposed end portions, and each said trough defining section is unitarily formed and includes flange portions defined along said opposed end portions for joining to adjacent members, and, when more than one said trough defining section is present, then said trough defining sections each have a similar cross-sectional trough internal surface configuration, and said trough defining sections are engageable in end to end longitudinally adjacent relationship thereby to define a common subassembly wherein said troughs thereof are longitudinally aligned along a common longitudinal axis, and including joining means for joining together said flange portions of said longitudinally adjacent trough defining sections;
(b) at least two bulkhead members, one said bulkhead member being disposable across a different one of said opposed ends of said trough defining section and when said common subassembly is present being disposable across each opposite end of said common subassembly, and also when said common subassembly is present then optionally one of said bulkhead members can be disposed adjacent to and between each longitudinally adjacent pair of said trough defining sections, and including means for engaging each said so disposed said bulkhead member with each adjacent said flange portion;
(c) shaft means extending longitudinally through said trough(s) and including both bearing means for rotatably supporting said shaft means and support means for supporting said bearing means at each of said so engaged bulkhead members;
(d) at least one contactor drum having an axial portion and a circumferentially extending peripheral portion, said axial portion being associated with said shaft means and adapted to rotate therewith in said trough(s), said contactor drum comprising a core portion and a plate portion along at least one side of said core portion, said core portion including a plurality of corrugated sheet members that cooperate to define a plurality of passageways that extend generally transversely through said core portion, said core portion and said plate portion being interconnected by a plurality of longitudinally extending, peripherally located, circumferentially spaced bracket members, and said contactor drum comprising of two portions that are interconnectable along approximately a diameter thereof that extends through a mid-portion thereof, and including fastening means for fastening said two portions together about and over a portion of said shaft means; and
(e) power means for rotating said shaft means, said power means comprising at least one member selected from the group consisting of electric motor drive means and paddle wheel drive means.

40. The apparatus of claim 39 wherein said power means includes an electric motor means.

41. The apparatus of claim 39 wherein said power means includes at least one paddle wheel that is axially associated with said shaft means and that is located in a region of said trough; and each said paddle wheel includes paddle blades and is comprised of two portions that are interconnectable along approximately a diameter thereof that extends through a mid-portion thereof, and fastening means is included for fastening said two portions together about and over a portion of said shaft means.

42. The apparatus of claim 41 wherein said power means further includes an electric motor for rotating said shaft means.

* * * * *